United States Patent [19]
Yoshida et al.

[11] Patent Number: 5,475,807
[45] Date of Patent: Dec. 12, 1995

[54] CHARACTER PROCESSING APPARATUS

[75] Inventors: Masayuki Yoshida; Keiko Nakanishi, both of Tokyo, Japan

[73] Assignee: Canon Kabushiki Kaisha, Tokyo, Japan

[21] Appl. No.: 452,001

[22] Filed: Dec. 18, 1989

[30] Foreign Application Priority Data

Dec. 19, 1988 [JP] Japan .................... 63-319931
Dec. 19, 1988 [JP] Japan .................... 63-319941
Dec. 19, 1988 [JP] Japan .................... 63-319942
Dec. 19, 1988 [JP] Japan .................... 63-319943
Dec. 19, 1988 [JP] Japan .................... 63-319944

[51] Int. Cl.$^6$ .................................................. G06T 11/00
[52] U.S. Cl. ........................ 395/150; 395/151; 395/110
[58] Field of Search ........................ 364/518–522; 395/147–151, 139, 141–143, 109, 110, 151, 164; 340/739

[56] References Cited

U.S. PATENT DOCUMENTS 4,475,162 10/1984 Kitamura .................. 395/143
4,677,575 6/1987 Redin ........................ 340/739
4,734,690 3/1988 Waller ....................... 364/521 X
4,841,453 6/1989 Finlay et al. .................. 395/110
5,018,078 5/1991 Urabe et al. .................. 395/164

*Primary Examiner*—Almis R. Jankus
*Attorney, Agent, or Firm*—Fitzpatrick, Cella, Harper & Scinto

[57] ABSTRACT

A character processing apparatus includes a reading circuit to read out data stored in a vector form; a first converter for multiplying an enlargement/reduction ratio to the readout data and converting the resultant data; and a second converter for converting the converted data into the data in a dot form, and a circuit to extract the data converted by the first converter in accordance with an output area which can be output in a lump, wherein the extracted data is converted by the second converter. When an output request indicates the row direction, the vector data is converted into the dot data in row. When an output request indicates the column direction, the vector data is converted into the dot data in column. Thus, a character of a high quality can be efficiently output at a high speed. When the vector data is converted into the dot data, the painting process is properly selectively executed in the row or column direction. Thus, a character can be formed at a high speed.

36 Claims, 19 Drawing Sheets

FIG. 6
X-COORDINATE TABLE
| ax |
| bx |
| cx |
| FFFF |
| dx |
| ex |
| FFFF |
Y-COORDINATE TABLE
| ay |
| by |
| cy |
| FFFF |
| dy |
| ey |
| FFFF |
OUTLINE TABLE
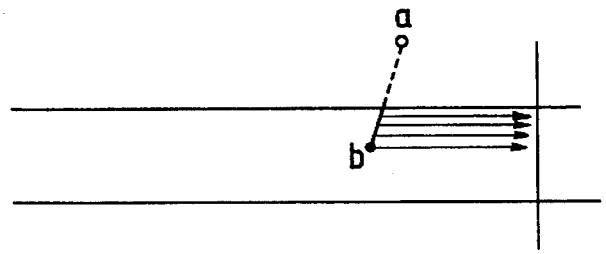
FIG. 7A
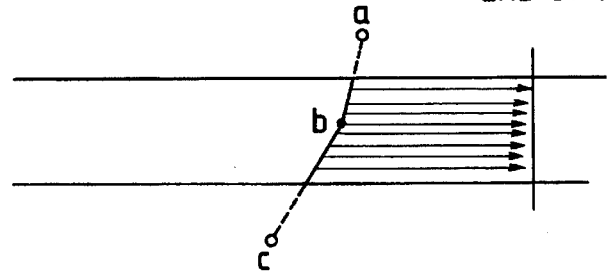
FIG. 7B
END OF AREA
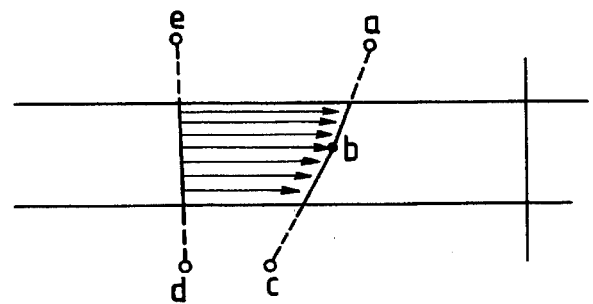
FIG. 7C

| FLAG 2 \ FLAG 1 | ON | OFF |
|---|---|---|
| ON | DATA CANNOT BE STORED IN THE MEMORY AS A WHOLE. DATA REMAINS. | — |
| OFF | DATA CANNOT BE STORED IN THE MEMORY AS A WHOLE. DATA DOES NOT REMAIN. | DATA CAN BE STORED IN THE MEMORY AS A WHOLE. |

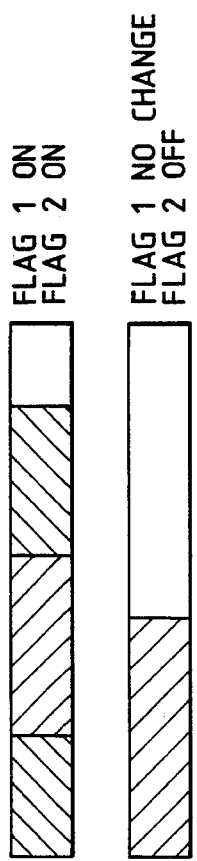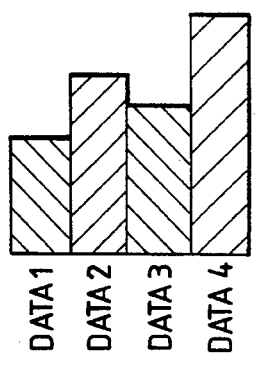
FIG. 17B
FIG. 17C
FIG. 17A
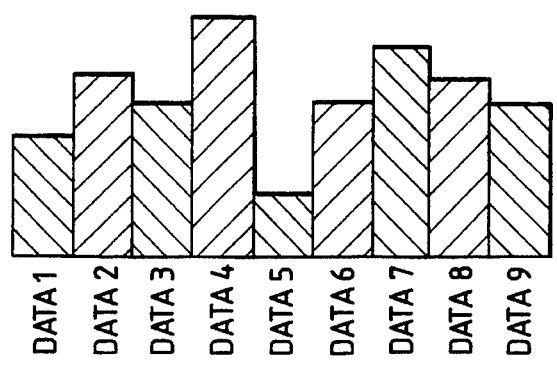
FIG. 18B
FIG. 18C
FIG. 18D
FIG. 18A

1 DOT

1 DOT

BS —— BAND START
BE —— BAND END

FIG. 27
| X-COORDINATE TABLE |
|---|
| ax |
| bx |
| cx |
| dx |
| ex |
| fx |
| gx |
| hx |
| Y-COORDINATE TABLE |
|---|
| ay |
| by |
| cy |
| dy |
| ey |
| fy |
| gy |
| hy |
$a_y = b_y$ NO PROCESSING
$c_y = d_y$ NO PROCESSING
$e_y = f_y$ PROCESSING
$g_y = h_y$ PROCESSING
FIG. 28
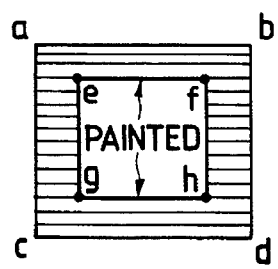
FIG. 29
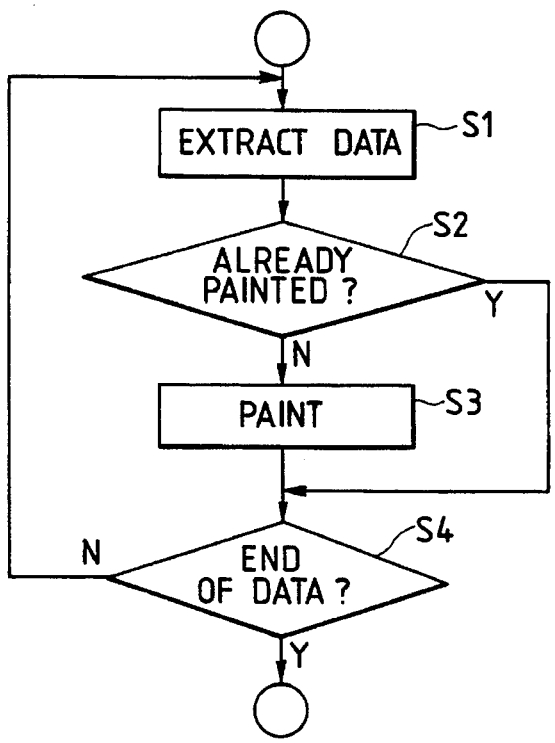

| THICKNESS OF FRAME | BIT PATTERN |
|---|---|
| 3 | 10111 ------- 11101 |
| 5 | 101011 ------- 110101 |
| 7 | 10101011 ----- 11010101 |
| ⋮ | ⋮ |

CHARACTER PROCESSING APPARATUS

BACKGROUND OF THE INVENTION

1. Field of the Invention

The present invention relates to a character processing apparatus having the function of converting data such as characters or the like coded in a vector form into a dot form.

2. Related Background Art

Hitherto, when data in a vector form is converted into data in a dot form, if the data consists of one character, the data is converted in a lump into the data in a dot form in a memory.

However, if the capacity of the memory is limited, vector data exceeding a matrix in the memory cannot be converted into dot form data.

On the other hand, in the case of an output device such as a thermal copy transfer type printer or the like which prints data line by line, after one character is converted into a dot form as a whole, it is output to the output device. Therefore, there is a problem that when data is output to the printer, it takes a long waiting time at the initial stage.

Hitherto, in the case where data in a vector form is converted into data in a dot form and is output to a line output type output device such as a thermal copy transfer printer or the like, the vector data is converted into the dot data character by character, or a data buffer is provided and the data is stored to the data buffer and is then converted into the dot form data.

However, in the former case, there is a problem that in order to output the data to the line output type output device, if data of one line has been output, no more data is in storage, and more data must be read out from the beginning and must be converted. This, takes a long processing time. In the latter case, there occurs a problem that, unlike dot form data, the size of the data in the vector form changes depending on the kind of font, so that the number of characters which can be stored is determined by the maximum data amount and the characters beyond such a predetermined number cannot be converted into data in the dot form. There is also a problem that since the number of storable characters is determined by the maximum data amount, the amount of unusable data increases.

Hitherto, when data in the vector form is converted into dot form data, all dot form data is formed in a row (for instance, in the row direction shown in FIG. 4) from the data in the vector form irrespective of the output device. One type of output device processes the data in the dot form in the row; another type of output device processes the data in the dot form in a column (for instance, in the column direction shown in FIG. 5). Therefore, in the conventional apparatuses, since the conversion from row to column must be executed as necessary on the output device side, there are problems that the required program size increases and that it takes a long processing time. On the other hand, in dependence on the band width which is required by the output device or characters, there is an output device with which the processing time becomes short if the painting process when the vector data form is converted into the dot data is executed in rows or an output device such that the processing time becomes short when the painting process is executed in column. Therefore, there is a problem such that if all of the processes are set to the same process, the processing time becomes long.

Hitherto, when vector data is converted into dot data, there has been proposed a method whereby the dot data is formed from the vector data while inverting the contents of the memory using the NOT of the logic operation (Japanese Patent Application 63-210450).

However, in the case of the above example, since the contents of the memory are inverted by the NOT, as shown in FIG. 1, no process is executed to the lateral line of a character, that is, the line segment whose Y coordinate does not change as shown in FIGS. 1A and 1B. Therefore, the size (width) of the lateral line becomes uneven in the cases of (a) (width W) and (b) (width W') or the lateral line is extinguished. Thus, there is a problem such that in the case of generating a small character, the character quality deteriorates.

FIG. 2 is a diagram showing an example in which vector data was converted into dot data. The lateral lines at positions shown by reference numerals 100 and 200 are extinguished.

In a manner similar to the above, there is also a problem such that the quality of figures or characters deteriorates.

According to the conventional technique, for instance, as disclosed in JP-B-53-41017, the character or the like which was coded by a stroke display method is converted into a dot display signal and, further, all of the signals between the "1" signal of the line output and the "1" signal are converted into "1" by a converting circuit and the high quality character signal of the dot display type is generated.

However, in the conventional example, since all of the signals between the "1" signal of the line output and the "1" signal are converted into "1", in order to express the frame line of a blank character by n dots from the signals, as shown in FIG. 30, the frame line is shifted by n bits with respect to the direction of the line output and the exclusive OR of the shifted data and the data before it is shifted must be calculated.

With respect to the value of n mentioned above, as the resolution of the output device such as printer, display, or the like rises, the output result becomes obscure when the value of n is small. Therefore, it is necessary to increase the value of n when the resolution of the output device rises. However, when the value of n increases, the line must be shifted by only the increased amount and there is a problem such that it takes a long processing time.

SUMMARY OF THE INVENTION

In order to solve the above problems, it is an object of the invention to provide a character processing apparatus in which a memory of one line of, for instance, a printer is used as a work memory to vector data into dot data, and after the vector data's area was extracted, the data is converted into the dot data in the memory, thereby reducing the memory capacity.

Another object of the invention is to provide a character processing apparatus in which a larger character can be output irrespective of the memory capacity and, further, all of the vector data of one character is first converted little by little without being converted into dot data, so that the waiting time can be reduced to as small a time as possible.

In consideration of the above points, in order to solve the above problems, another object of the invention is to provide a character processing apparatus comprising a memory to store data in a vector form and means for discriminating a state of the storage, wherein whether the data storage is divisionally executed a plurality of number of times or not can be controlled.

In consideration of the above points, still another object of the invention is to provide a character processing apparatus in which when the number of characters is small, the process is executed at a high speed and even for a character string exceeding the capacity of a memory prepared, data can be output without a limit of the number of characters.

To solve the above problems, still another object of the invention is to provide a character processing apparatus in which a check is made to see if an output request indicates a row or column, and when the output request indicates a row, data in a vector form is converted into data in a dot form in the row, on the other hand, when the output request indicates a column, data in the vector form is converted into data in the dot form in the column, thereby enabling characters to be efficiently generated.

In consideration of the above points, still another object of the invention is to provide a character processing apparatus in which a check is made to see if the painting process in the case of converting data in a vector form into data in a dot form is executed in row or column, and the painting process is switched in accordance with the result of the discrimination, thereby enabling characters to be generated at a higher speed.

In consideration of the above points, still another object of the invention is to provide a character processing apparatus in which for a pattern which was once converted from vector data into dot data, the painting process is again properly executed by using the NOT at a necessary position, thereby enabling a lateral line width to be uniformly held.

In consideration of the above points, still another object of the invention is to provide a figure generating system in which all of the signals between a "1" signal of a line output and a "1" signal are not converted into "1" but "0" is interposed at proper positions and the signals between the "1" signal of the line output and the "1" signal are converted, so that when a blank figure or the like is generated, by merely shifting by one bit and by calculating the exclusive OR of the data which was shifted by one bit and the data before it is shifted, a frame of n dots can be obtained.

BRIEF DESCRIPTION OF THE DRAWINGS

FIG. 6 shows information of an outline table;

FIGS. 7A, 7B and 7C show examples of a process to paint the inside of an outline;

FIGS. 17A, 17B and 17C are diagrams showing the relations between the data and the memory according to the invention;

FIGS. 18A, 18B, 18C and 18D are diagrams showing the relations between the data and the memory according to the invention;

FIG. 27 shows a data train in the vector form;

FIG. 28 shows an embodiment of the invention;

FIG. 29 is a flowchart showing the operation of the invention;

DETAILED DESCRIPTION OF THE PREFERRED EMBODIMENTS

An embodiment of the present invention will be described hereinbelow with reference to the drawings. The invention can be accomplished by a single apparatus or may be accomplished by a plurality of apparatuses through a network or the like. Or, the invention can be applied to a personal computer or the like where it is accomplished by software which is supplied in an apparatus such as a personal computer or the like.

[Bank-like memory management]

An embodiment of the invention will now be described.

Figure 3:
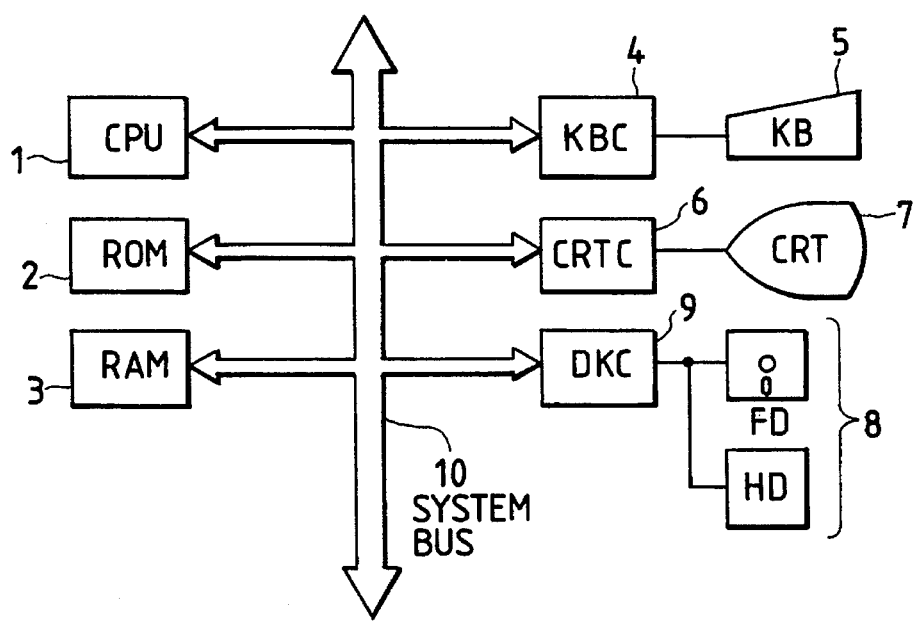
FIG. 3 is a block diagram showing an internal construction of the invention.

FIG. 3 is a block diagram showing a fundamental construction of a word processor according to the invention. In FIG. 3, reference numeral 1 denotes a CPU (central processing unit) for executing the control, arithmetic operating processes, and the like for the whole apparatus. Reference numeral 2 indicates an ROM (read only memory) in which a system executing program and programs which are expressed by all of flowcharts, which will be explained hereinlater are stored. The ROM 2 also stores character patterns, data, etc. Reference numeral 3 denotes an RAM (random access memory) serving as a data memory area whose use is not limited. Programs and data are loaded in the RAM 3 and various programs are executed. Reference numeral 4 indicates a KBC (keyboard control unit) which receives key input data from a KB (keyboard) 5 and transfers data to the CPU 1; 6 indicates a CRTC (display control unit); 7 a CRT (display device) which receives the data from the CRTC 6 and displays it; and 8 an external memory device such as FD (floppy disk device), HD (hard disk device), or the like for storing programs and data and referring or loading the data into the RAM as necessary upon execution. Reference numeral 9 indicates a DKC (disk control unit) for controlling the data transmission and the like. Reference numeral 10 represents a system bus serving as a path of data among the above component elements.

The operation of the embodiment with the above construction will now be described with reference to FIGS. 4 to 8 and a flowchart of FIG. 9 as an example.

Figure 4:
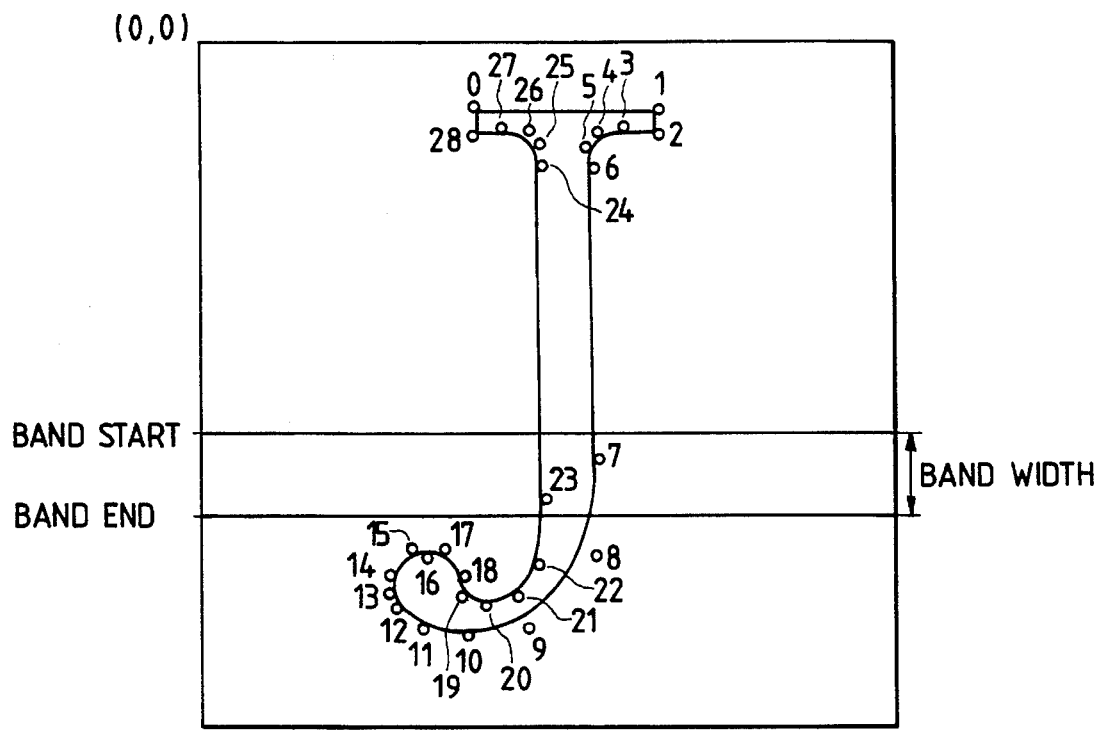
FIG. 4 shows an example of a character in a vector form.
Figure 5:
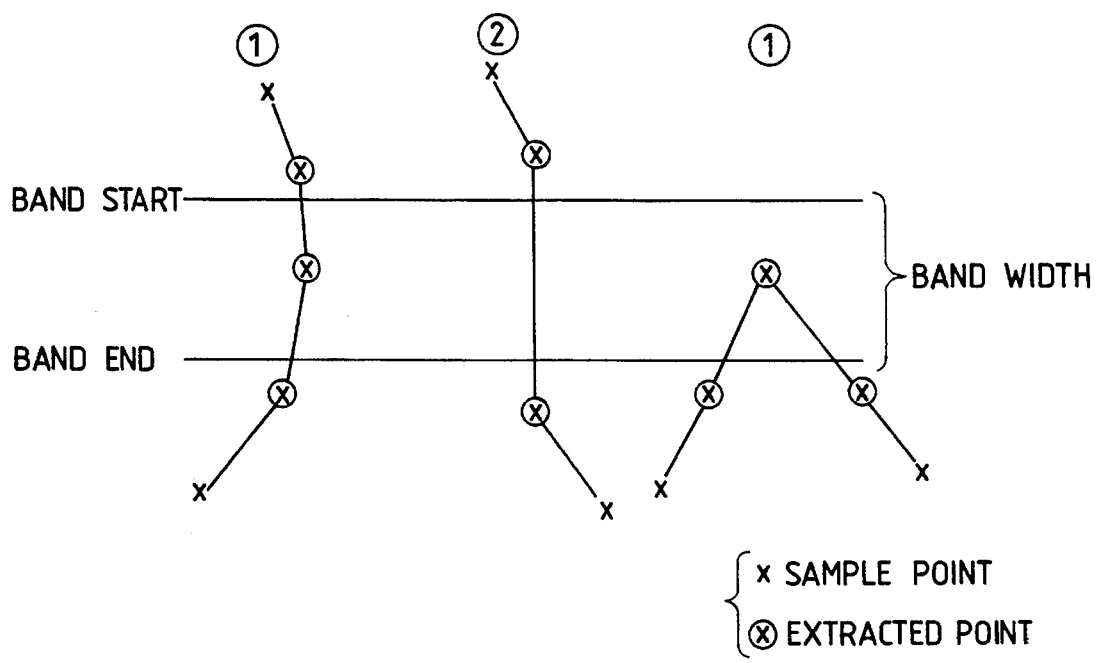
FIG. 5 shows an example of the extraction of the related points from a band.
Figure 9:
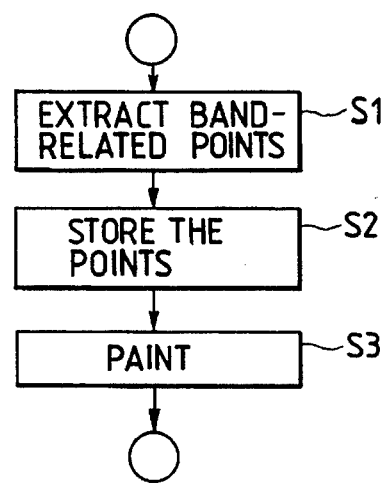
FIG. 9 is a flowchart for forming a vector font in the case of only straight line data.

FIG. 4 relates to step 1 in FIG. 9 and shows an example of a character in the vector form to be output. The left upper position in a square area assumes coordinates (0, 0) of the origin. An output request of a dot pattern is sent line by line from a line output type printer. That is, the band width from the start of band to the end of band is set to a dot pattern output request area from the printer. It is intended to extract the points regarding the output request area. As shown in FIG. 5, the points regarding the output area denote ① a certain point existing in a range from the start of the band to the end of the band and both of the points adjacent to that point or ② two points comprising a certain point and point adjacent thereto in the case where the Y coordinate of the certain point is smaller than the coordinate of the start of the band and the point adjacent to this point is larger than the coordinate of the end of the band.

The information of the start and end points of the outline of those points is extracted for the whole character. The extracted points are stored into the outline tables of the X and Y coordinates as shown in FIG. 6 corresponding to step 2 in FIG. 9. However, when storing the extracted points, in the case where there is no relation among the data to be stored into the table (for instance, points c and d in FIG. 7C, that is, points c ($c_x$, $c_y$) and d ($d_x$, $d_y$) in the outline tables), impossible values (FFFF) indicative of the meaning such that there is no relation among the data between the points c and d are stored.

On the basis of the information of the outline table obtained in FIG. 6, in step 3 in FIG. 9, the area in the outline is painted by a method as shown in FIG. 7. In FIG. 7, two coordinates are first sequentially extracted from the outline table of FIG. 6. In FIG. 7A, the coordinates of points a ($a_x$, $a_y$) and b ($b_x$, $b_y$) are extracted. When they are smaller than the Y coordinate of the start of the band, no process is executed. If they relate to the points in the band, the area until the end of the character area which has previously been calculated and obtained from the size of character is inverted by the NOT and is painted. On the other hand, in FIG. 7B, with respect to the points b ($b_x$, $b_y$) and c ($c_x$, $c_y$), the area is painted by a similar method. However, when they are larger than the Y coordinate of the band, no process is executed. Next, c ($c_x$, $c_y$) and (FFFF, FFFF) are extracted as coordinate data. However, since FFFF denote the delimiter of the data as mentioned above, no process is executed here and a pointer to the data is advanced and the next coordinate data d ($d_x$, $d_y$) and e ($e_x$, $e_y$) are extracted. As shown in FIG. 7C, from those two coordinates, the area from the coordinates regarding the inside of the band until the end of the area is inverted by the NOT and is painted. When the processes are executed until the last data stored in the outline tables as mentioned above, the painting process of the data with respect to one font is finished.

Figure 8A:
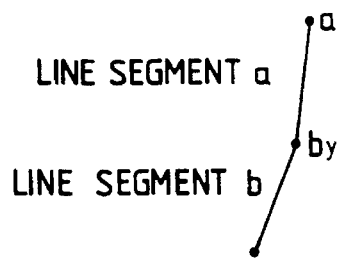
FIGS. 8A and 8B show special processes upon painting.
Figure 8B:
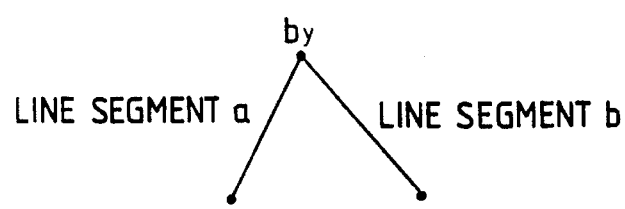

As a notice when painting as mentioned above, processes as shown in FIG. 8 must be executed. That is, when the directions of the Y coordinates of two line segments are the same as shown in FIG. 8A, the process is executed until $b_y$ with respect to the line segment a and the process is performed from $b_{y+1}$ with regard to the line segment b. On the other hand, in the case of FIG. 8B, the process is executed until $b_y$ with respect to the line segment a and the process is also performed from $b_y$ with regard to the line segment b. By executing such processes, a variation in painting is eliminated.

[Another embodiment]

Although the above embodiment has been described with respect to the example in which all of the data in the vector form are the straight lines, there are actually the case where the data in the vector form is a straight line and the case where it is a curve. To distinguish the data of the straight line/curve, information indicative of the start of the curve and the end of the curve are added to each coordinate data. That is, the coordinate points from the curve start to the curve end are the data which denotes the curve. The other coordinate points are the data indicative of the straight line.

Figure 10:
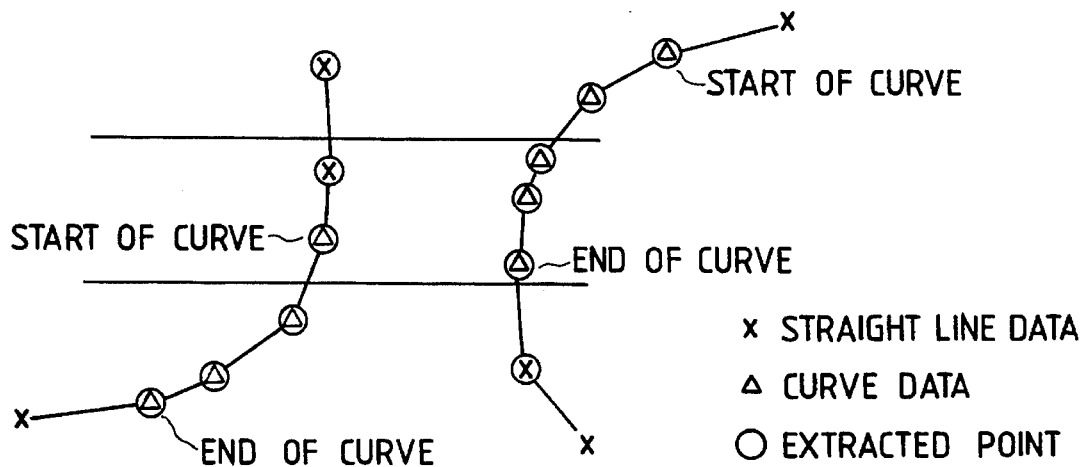
FIG. 10 shows an example of the extraction of the related points from a band in the case including curve data.

Therefore, explanation will now be made with reference to flowcharts of FIGS. 10 and 11 as examples in comparison with the embodiment in the case of only the straight line data.

When the coordinate data at both ends of the data regarding the inside of the band which was extracted in FIG. 4 relates to the area between the curve start and the curve end, that is, the intermediate region of the curve, all of the curve data must be extracted. Therefore, the range from which the data between both ends of the points in the band has been extracted is further widened. In steps 2 and 3 in FIG. 11, as shown in FIG. 10, the data until the point of the curve start or the point of the curve end is extracted as data regarding the inside of the band.

Figure 11:
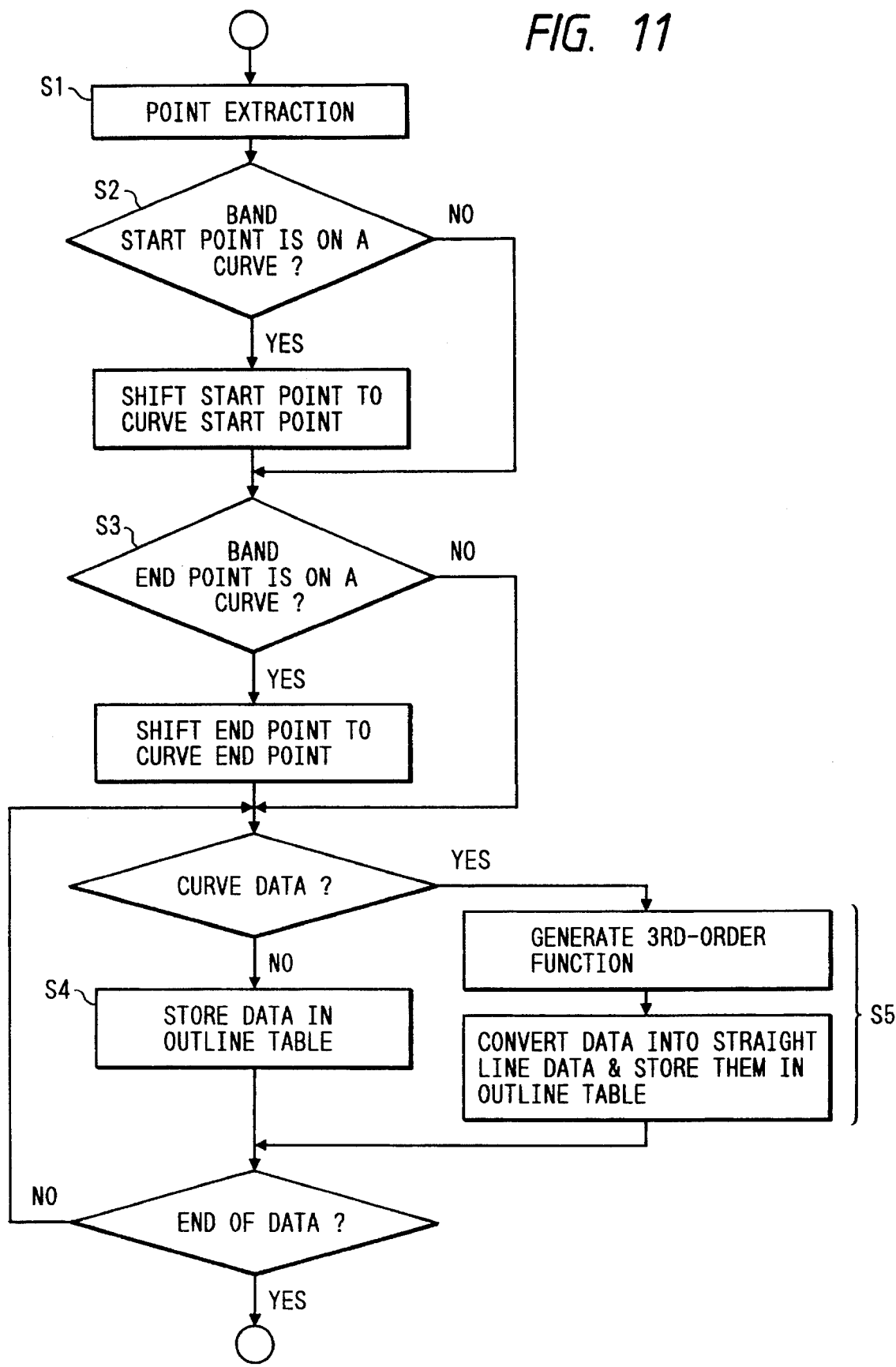
FIG. 11 is a flowchart for forming a vector font in the case including curve data.

In steps 4 and 5 in FIG. 11, in the case of the straight line data, step 4 follows and the data is stored into the outline tables in FIG. 6 and in the case of the curve data, step 5 follows. In step 5, after the curve data was once converted into the straight line data, it is stored into the outline tables.

After the coordinate data was stored as the straight line data into the outline tables, the processes which have been described in FIG. 7 are executed and the area in the outline is painted.

[Another embodiment]

All of the data stored in the vector form are constructed by a predetermined coordinate system such as 256×256 dots or the like. Therefore, if the operator wants to output at a desired character size, it is necessary to change the size of the coordinate system by multiplying an enlargement or reduction ratio to the data stored. However, when considering the output device, there are various output devices of different densities such as thermal copy transfer printer, laser beam printer, wire dot printer, CRT, and the like. Therefore, in order to output data at a desired size to each of the output devices of different densities, it is necessary that the density of the output device is provided as an internal parameter and the enlargement or reduction ratio is determined in accordance with the parameter.

Explanation will now be made hereinbelow with reference to a flowchart of FIG. 12.

Figure 12:
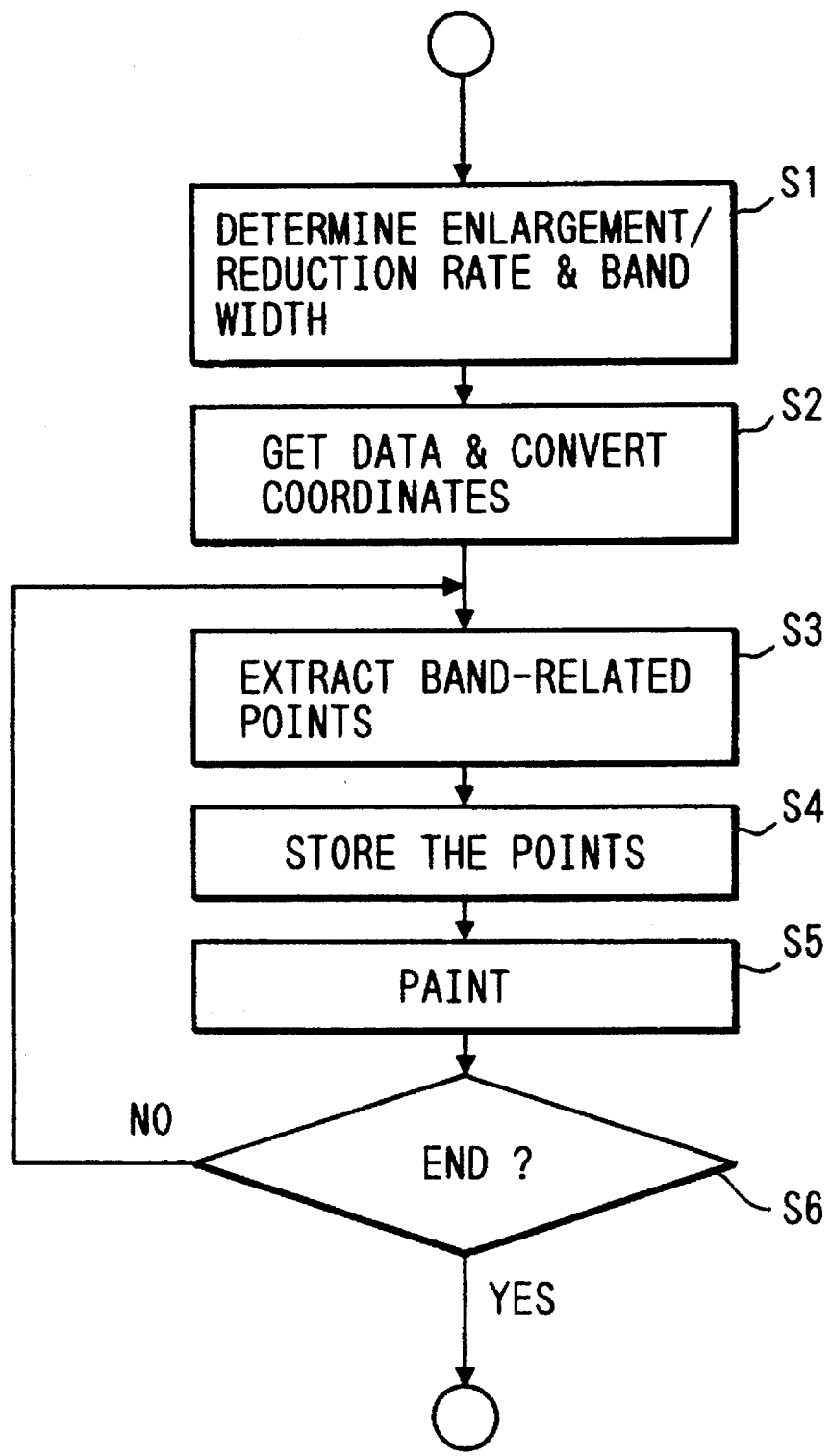
FIG. 12 is a flowchart for forming a vector font in which the process to change a value of an internal parameter by an output device is added.

FIG. 12 is a flowchart for the whole vector font generating apparatus. When an output request of data is input from the output device, the density, designated character string, designated magnification, etc. of the output device are also transmitted. In step 1, the enlargement/reduction ratio and the band width are decided on the basis of the density of the output device.

The enlargement/reduction ratio can be obtained by the following equation from the density (DPI: Dot Per Inch) of the output device, the size (Point) of the designated character train, and the original size (MS: Master Size) of the data stored in the vector form.

$$\text{Enlargement/reduction ratio} = \frac{DPI \times \text{Point}/72}{MS}$$

On the other hand, since the band width is a width at which the output device can output data at once, it can be obtained by the following equation.

Band width=$DPI \times \alpha$ ($\alpha$ is a constant)

In step 2, the enlargement/reduction ratio is multiplied to the read data and the data as much as the designated number of characters is stored into the memory.

In steps 3 and 5, as mentioned in the above embodiment, only the points regarding the band are extracted with respect to one character, and if curve data exists, it is converted into the straight line data and stored, and the inside of the outline is painted on the basis of the coordinates of the stored points.

In step 6, a check is made to see if the designated character string is the end or not. If YES, the processes are finished. If NO, the next character is extracted from the buffer and the processes in steps 3 to 5 are executed.

As mentioned above, according to the embodiment, in the line output type printer such as a thermal copy transfer printer or the like, by providing a memory of a capacity of at least one line, a larger pattern can be output at a high speed.

As mentioned in detail above, according to the invention, it is possible to provide a character processing apparatus which can output a larger character irrespective of the memory capacity and, further, can reduce the waiting time as short as possible.

[Storage management of vector data]

Another embodiment of the invention will now be described. Prior to explaining the embodiment of the invention, the development from the ordinary vector data will be first explained with reference to FIGS. 13 and 14 as examples.

Figure 13:
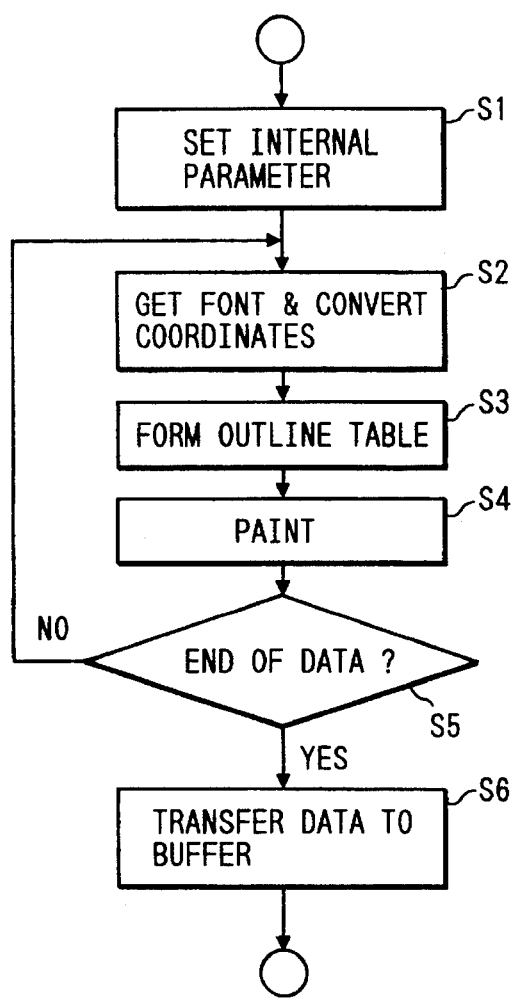
FIGS. 13(1) and 13(2) are general flowcharts for converting vector data into dot data.
Figure 13:
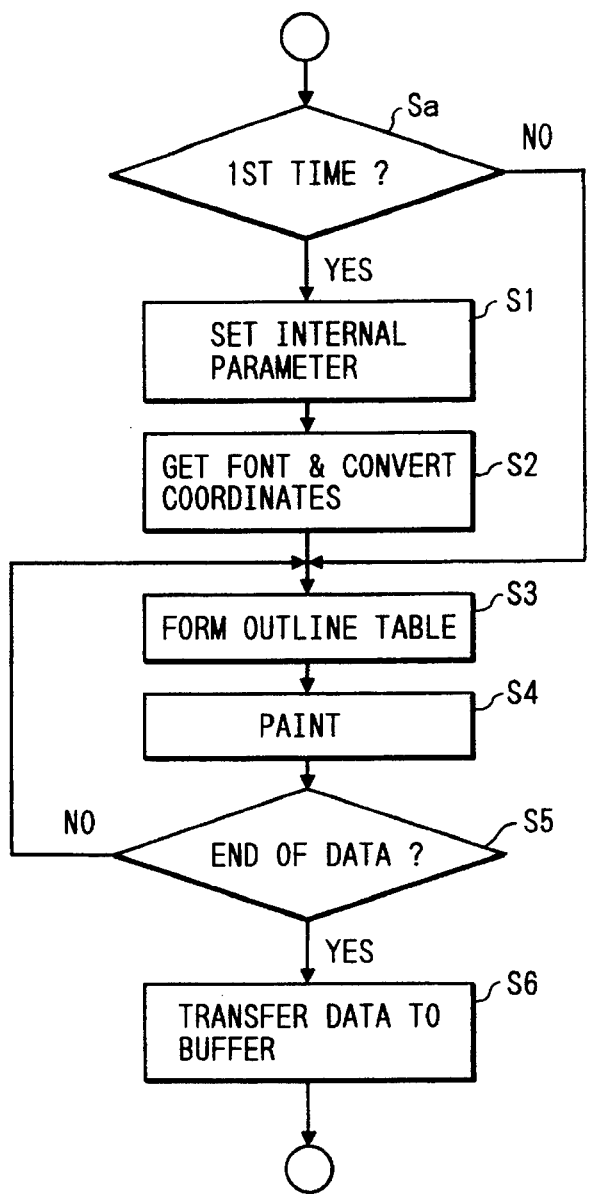
Figures 14, 16:
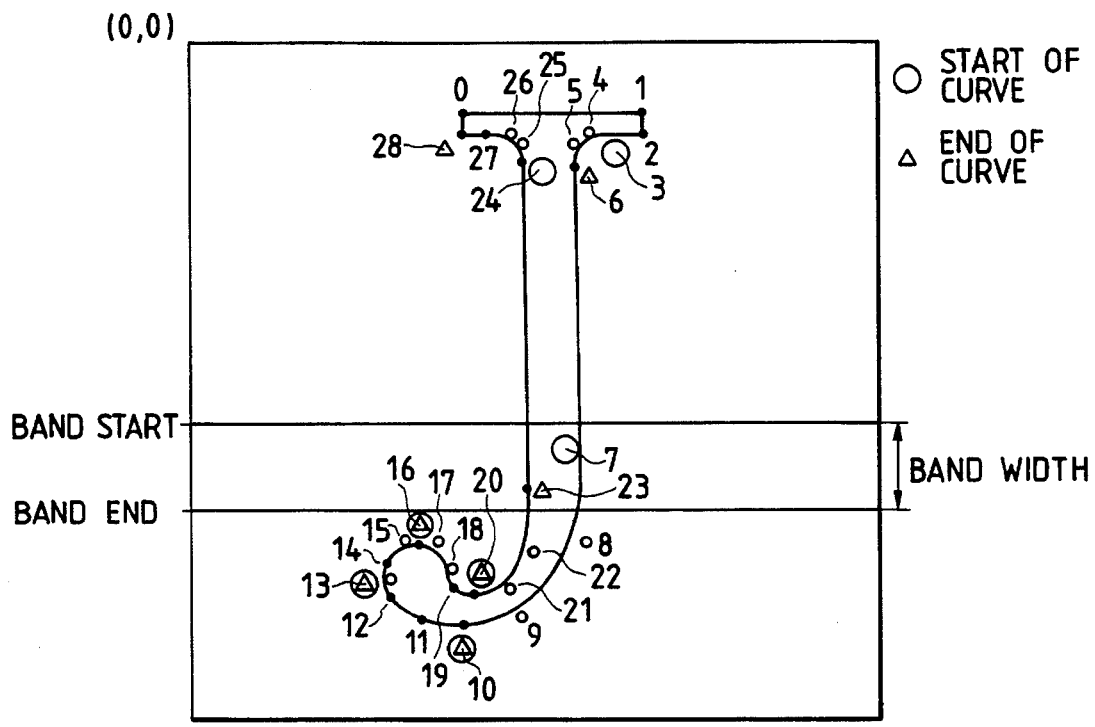
FIG. 14 shows an example of the conversion from the vector form to the dot form.
FIG. 16 is a diagram showing states of flags according to the invention.
Figure 15:
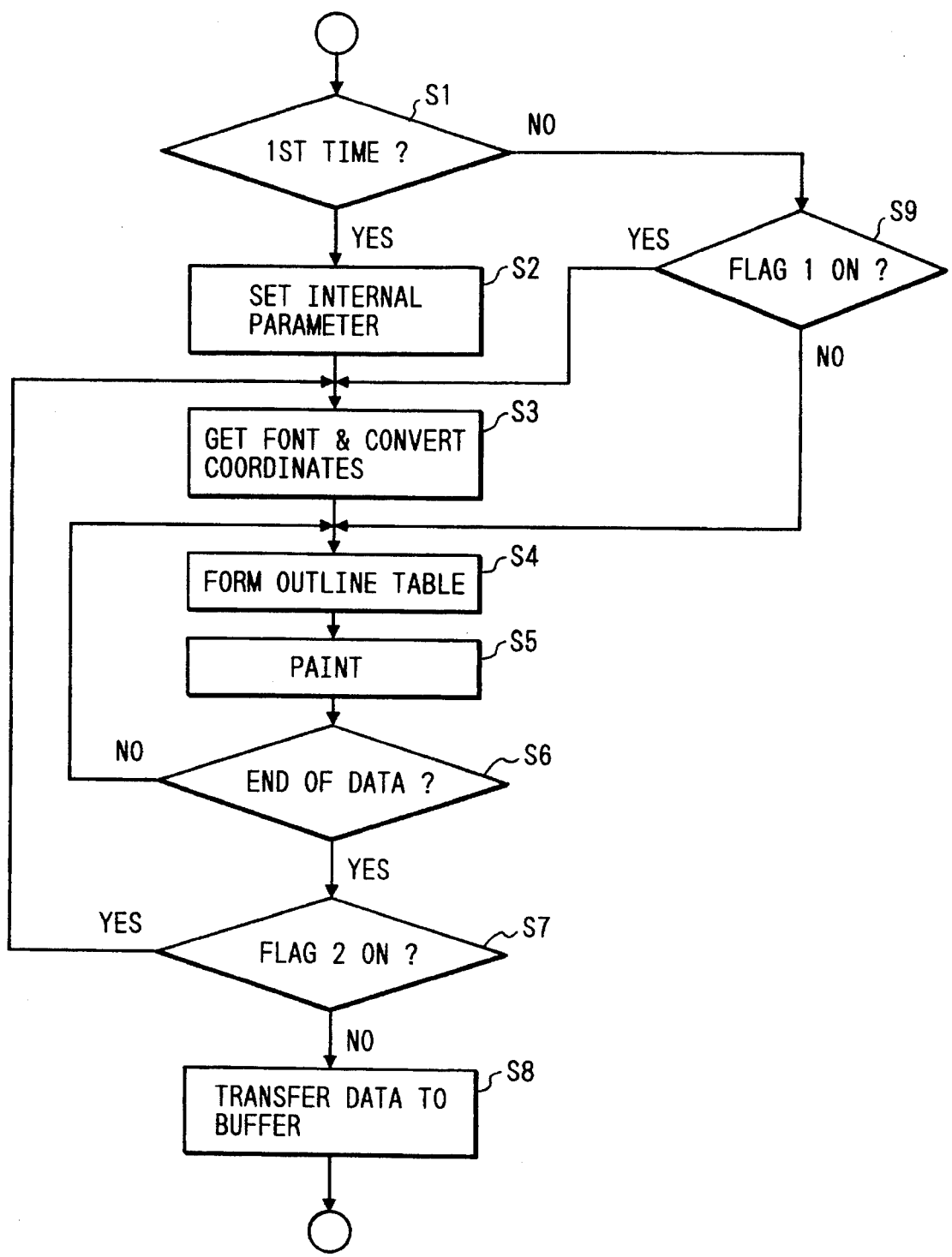
FIG. 15 is a flowchart showing the operation of the invention.

FIG. 13 is a flowchart showing a flow of the whole operation in the above examples. FIG. 13(1) relates to a system in which data is extracted and processed one character by one. FIG. 13(2) relates to a system in which data of the amount which can be stored into a prepared memory is stored and processed. In step 1 in FIG. 13, the enlargement/reduction ratio and the width, i.e., the band width at which another output device can output a line output shown in FIG. 14 are determined by the parameters which are transferred from the output device together with a data output request. In step 2, the data in the vector form is read and multiplied with the enlargement/reduction ratio. Only the data regarding the band start and the band end shown in FIG. 14 is extracted. In step 4, the data is painted while drawing an outline. In the above processes in steps 2 to 4, the data in the band of one character is made. In step 5, a check is made to see if the character string still exists or not. If NO, step 6 follows and the data is transferred to the output device and the processes are finished. If any character to be output still exists, the processing routine is returned to step 2 and the data in the vector form for one character is converted into the data in the dot form.

After the data was transferred to the printer, if the coordinate of the band end is smaller than the value of the Y coordinate of the font data, the values of the band start/band end are updated. When a data output request is again input from the printer side, the processes in steps 1 to 6 are executed.

In the case of FIG. 13(2), in the process in step 2, the processes such that after the enlargement/reduction ratio was multiplied to the data in the vector form, the data is sequentially stored into a memory which can store the data which has previously been prepared are added. That is, in FIG. 13(1), the data is processed one character by one. In FIG. 13(2), the enlargement/reduction ratio is multiplied to the data of the amount of the designated character string and, thereafter, the resultant data is stored into the memory and is processed. In step 3, the data of one character stored is extracted from the memory and only the data regarding the inside of the band is extracted. In step 4, the area in the outline is painted. In step 5, a check is made to see if any data to be processed still exists or not. If YES, the processing routine is returned to step 3 and the data of the next one character of the stored data is extracted from the memory and is subjected to the similar processes. If the absence of the data to be processed is determined in step 5, step 6 follows and the data is output to the output device and the processes are finished.

As mentioned above, since the data multiplied with the enlargement/reduction ratio has been stored, when the data output request is first generated from the output device, that is, only when the band start exists on the top in FIG. 5, it is sufficient to execute the processes in steps 1 and 2. Therefore, since the data has been stored in the memory when the second and subsequent data output requests are input, discrimination is executed in step a and step 3 follows. The processes in steps 1 and 2 are not executed.

A feature of the embodiment will now be described with reference to FIGS. 15 to 18. A construction of the block diagram shown in FIG. 3 is commonly used. The whole flow of the embodiment of the invention is as shown in a flowchart of FIG. 15. In step 2, the enlargement/reduction ratio and the band width are decided in a manner similar to the above. In step 3, the data in the vector form is multiplied with the enlargement/reduction ratio and the resultant data is stored into the memory. As shown in FIG. 16, the states of two flags are changed in accordance with the size of data. When the flag 1 is set to ON, this means that the whole data cannot be stored into the memory, so that it must be divided and stored. When it is set to OFF, this means that the whole data can be completely stored into the memory. When the flag 2 is set to ON, this means that the data to be stored cannot be completely stored until the last data and data which cannot be stored still exists. When the flag 2 is set to OFF, this means that the data to be stored does not remain. Therefore, after the first state of the flag 1 was changed, the state of the flag 1 does not change. However, the state of the flag 2 sequentially changes depending on the state of the data to be stored.

In steps 4 to 6, the stored data in the vector form is converted into the data in the dot form.

In step 7, the when the flag 2 is set to ON by checking the state of the flag 2 which was set in step 3, that is, if the remaining data still exists, the processing routine is returned to step 3. When the flag 2 is set to OFF, namely, when no remaining data exists, step 8 follows and the data is transferred to the output device and the processes are finished.

After the data of one line was output, if the next data output request is input, since the internal parameters have already been set, the answer in the discriminating step 1 is NO and the processing routine advances to step 9. In step 9, by checking the state of the flag 1, if the flag 1 is set to ON, namely, when the data has been divisionally stored, the data stored in the memory is not the data from the beginning. Therefore, step 3 follows and the data in the vector form is again read. When the flag 1 is set to OFF, that is, when all of the data have already been stored in the memory, since there is no need to again read the data in the vector form, step 4 follows.

FIGS. 17 and 18 are diagrams showing in detail the data amounts and the states of the memory in the embodiment.

FIGS. 17A and 18A are diagrams showing the data amounts of the designated character trains. FIG. 17 shows the case of four characters. FIG. 18 shows the case of nine characters. FIGS. 17B and 17C and FIGS. 18B, 18C, and 18D relate to the examples each showing a state in which data has been stored in the memory. FIG. 17 shows the case of an example in which the data of three characters can be stored and the data of the remaining one character could not be stored. In this case, the flags 1 and 2 are set to ON. After the 1 data in the vector form was converted into the data in the dot form in steps 4 to 6 in FIG. 15, the processing routine is returned from step 7 to step 3. The content of the memory is once cleared and the data of the remaining fourth character is stored. At this time, the value of the flag 1 is held but the flag 2 is set to OFF since no data remains now.

In FIG. 18B, the data of the first three characters are stored and the flags 1 and 2 are set to ON. After the data of three characters were converted into the data in the dot form, the processing routine is returned from step 7 to step 3 in FIG. 15. The data of the next three characters is stored as shown in FIG. 18C. At this time, the flags 1 and 2 are held ON. After the data of the next three characters was converted into the data in the dot form, the processing routine is further returned from step 7 to step 3. The data of the last ninth character is stored and the flag 2 is set to OFF. The data in the vector form of the ninth character was converted into the data in the dot form, the data is transferred to the output device and the data processes of one line are finished.

As mentioned above, in the example, in the apparatus of the type for converting the data in the vector form into the data in the dot form, by providing at least one or more discrimination flag register, the data can be output at a high speed when the number of characters is small irrespective of the memory capacity. On the other hand, even the data exceeding the memory capacity can be output without being limited by the number of characters.

As described in detail above, according to the invention, it is possible to provide a character processing apparatus comprising: the memory to store the data in the vector form; and the means for discriminating the state of the data storage in the memory, wherein it is possible to control whether the data storage is divisionally executed a plurality of times or not in order to solve the foregoing problems.

As described above, according to the invention, it is possible to provide a character processing apparatus in which the processes can be executed at a high speed when the number of characters is small, and data can be output without a limit of the number of characters for a character string exceeding the capacity of a memory prepared.

[Switching of output in row/column]

Figure 19:
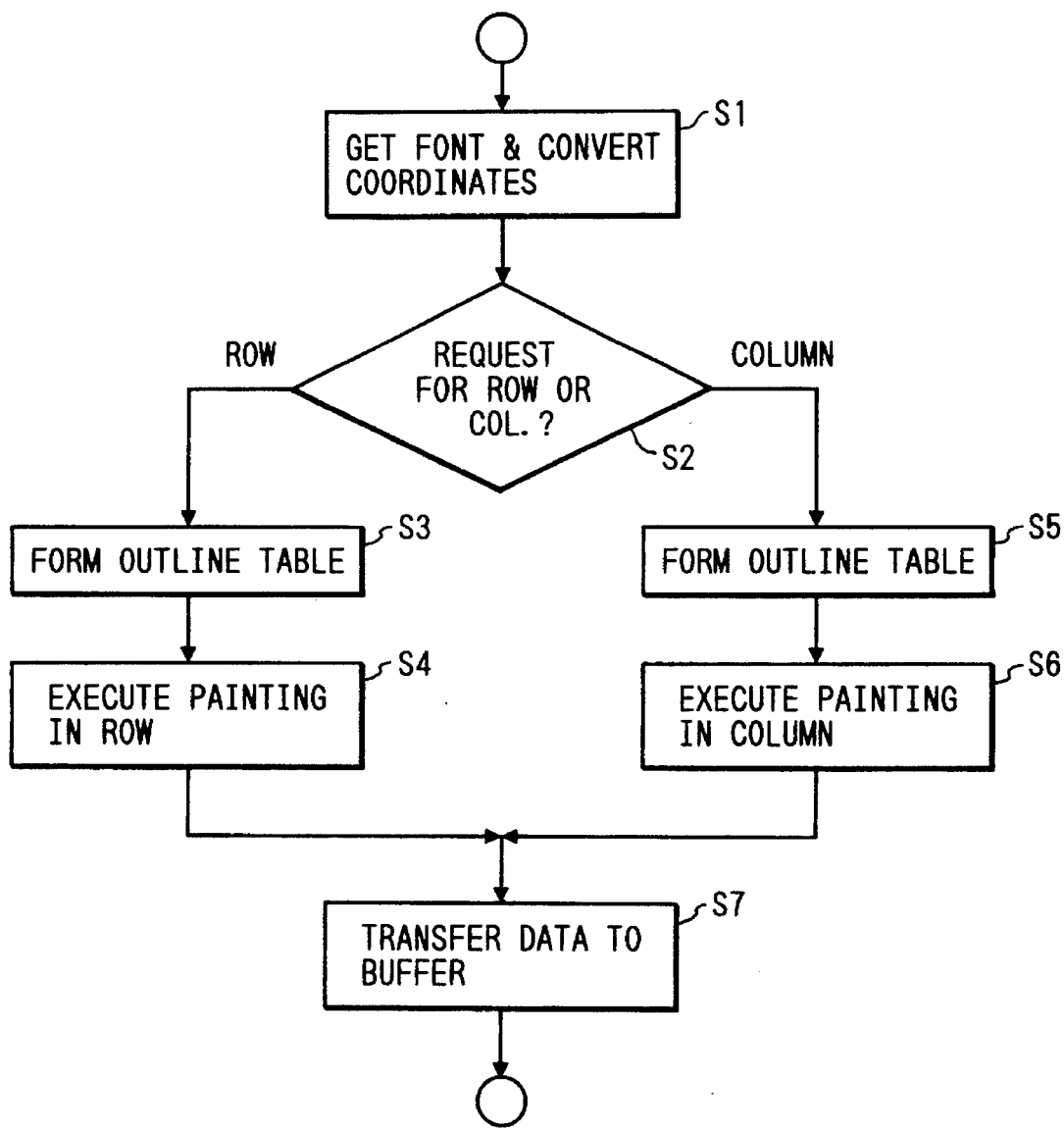
FIG. 19 is a flowchart showing an example of a control procedure in an embodiment of the invention.
Figure 20:
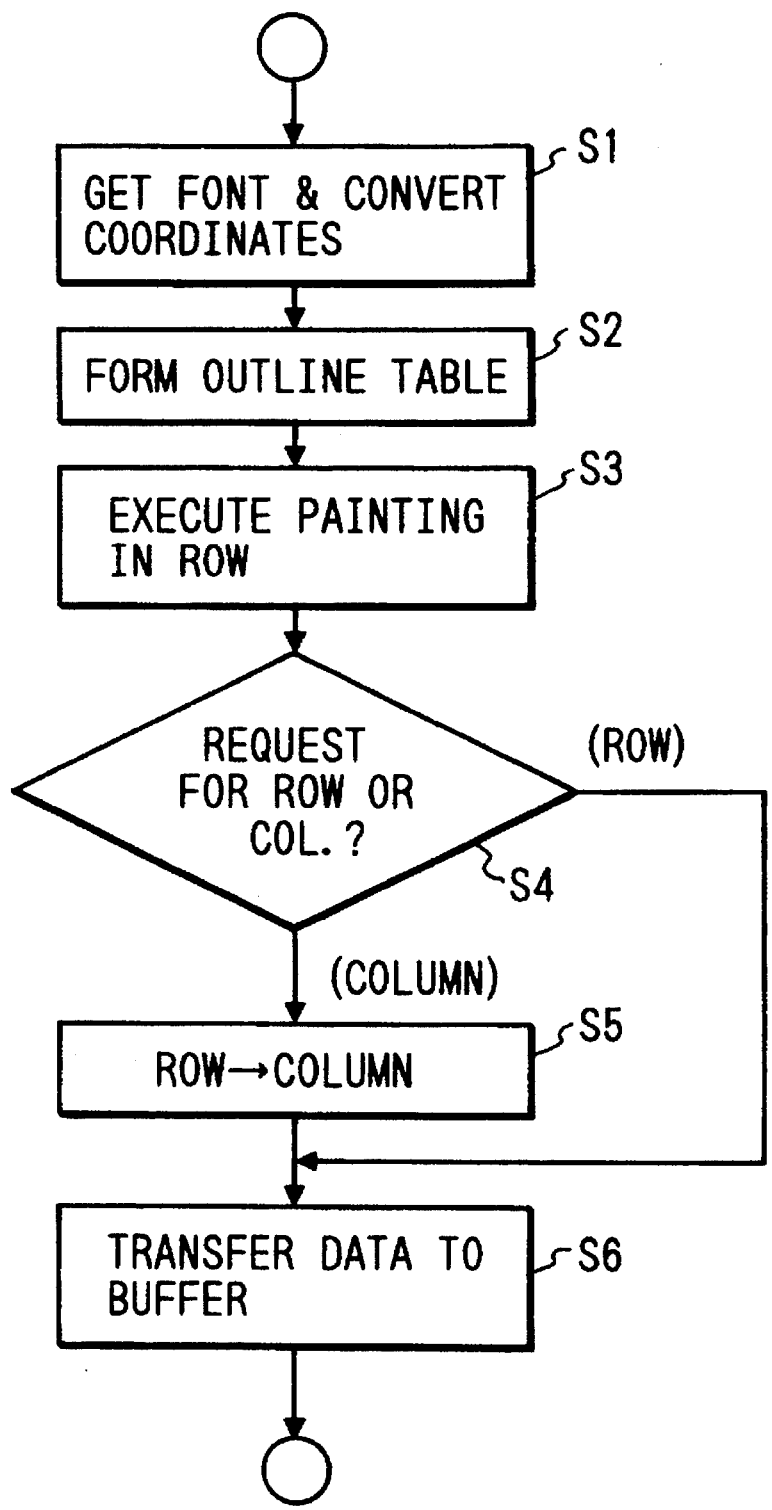
FIG. 20 is a flowchart showing an example of a control procedure in an embodiment of the invention.
Figure 21:
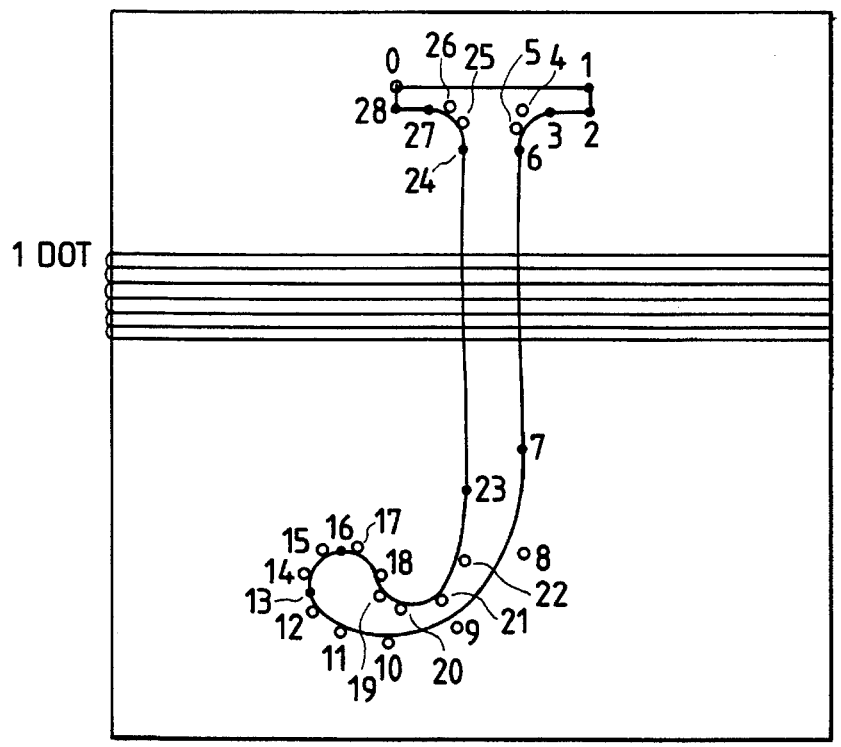
FIG. 21 is an explanatory diagram for the painting process in rows.
Figure 22:
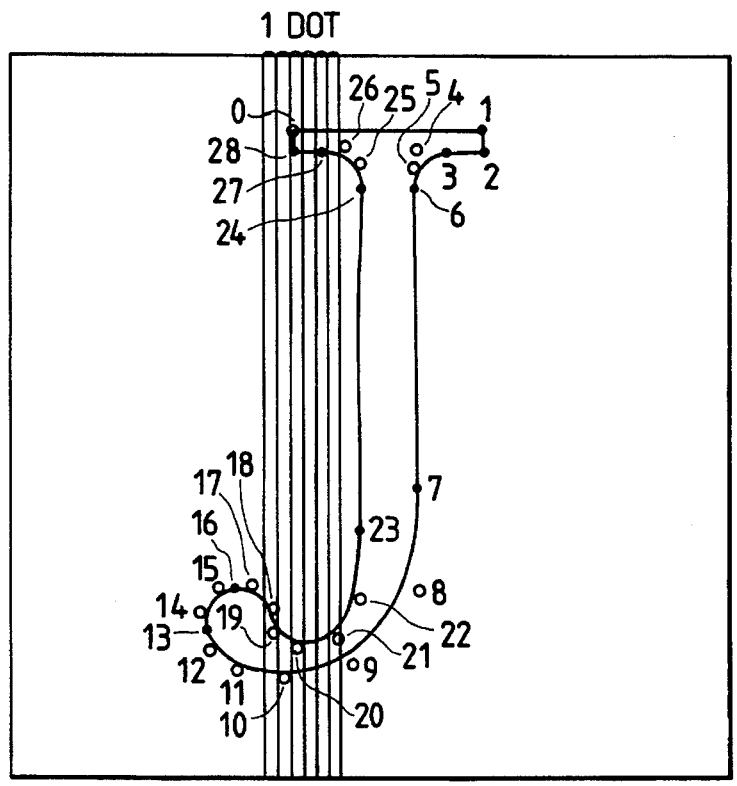
FIG. 22 is an explanatory diagram for the painting process in columns.

FIG. 19 is a flowchart showing an example of the operation of the embodiment. Step S1 relates to processes for reading out the data of the designated character from the data stored in the vector form, for multiplying an enlargement/ reduction ratio to the read data, and for converting the resultant data into the coordinate data. These processes are the processes which are ordinarily executed. In step S2, a check is made to see if an output request indicates row or column. Such a discrimination in step S2 is realized by setting ON/OFF flag into a memory such as an RAM 3 or the like in FIG. 3 on the output side and by executing the output request. Such a discrimination can be also accomplished by another method whereby the position from which the output request was generated (for instance, the display is set to row, the print is set to column, etc.) is discriminated by reading the content of the memory or the flag, and either the row or the column is previously stored for each case and is read out. If the output request indicates the row in step S2, step S3 follows and the process (the process which is ordinarily executed) to store the coordinate data on an outline unit basis as necessary is performed. Then, step S4 follows and the painting process is executed in row. FIG. 21 is a diagram for explaining that the painting process is executed in row. The printing process is executed in row, i.e., in the row direction on the basis of the coordinate data. Since the painting process is ordinarily executed, its detailed description is omitted here. The processing routine advances from step S4 to step S7 and the data is transferred from the output request side to the designated buffer. If the output request is set to column in step S2, step S5 follows and the outline table forming process is performed. Then, step S6 follows and the painting process is executed in column. FIG. 22 is a diagram for explaining that the painting process is performed in column. The painting process is executed in column, namely, in the column direction on the basis of the coordinate data. Then, step S7 follows and the data is transferred from the output request side to the designated buffer. FIG. 20 is a flowchart showing another example of the embodiment. In FIG. 19, the painting process is first executed and, thereafter, a check is made in FIG. 20 to see if the output request indicates row or column. In steps S1 to S3 in FIG. 20, the painting process is executed in row. In step S4, a check is made to see if the output request indicates row or column. If the output request indicates column, step S5 follows and the data conversion from row to column is executed. In step S6, the data is transferred from the output request side to the designated buffer. If the output request indicates row in step S4, step S6 follows and the data is transferred to the buffer. Although the case of executing the painting process in row in steps S1 to S3 has been described, the painting process can be also executed in column instead of row. In this case, if the output request indicates row in step S4, the data conversion from column to row is executed in step S5.

Figure 23:
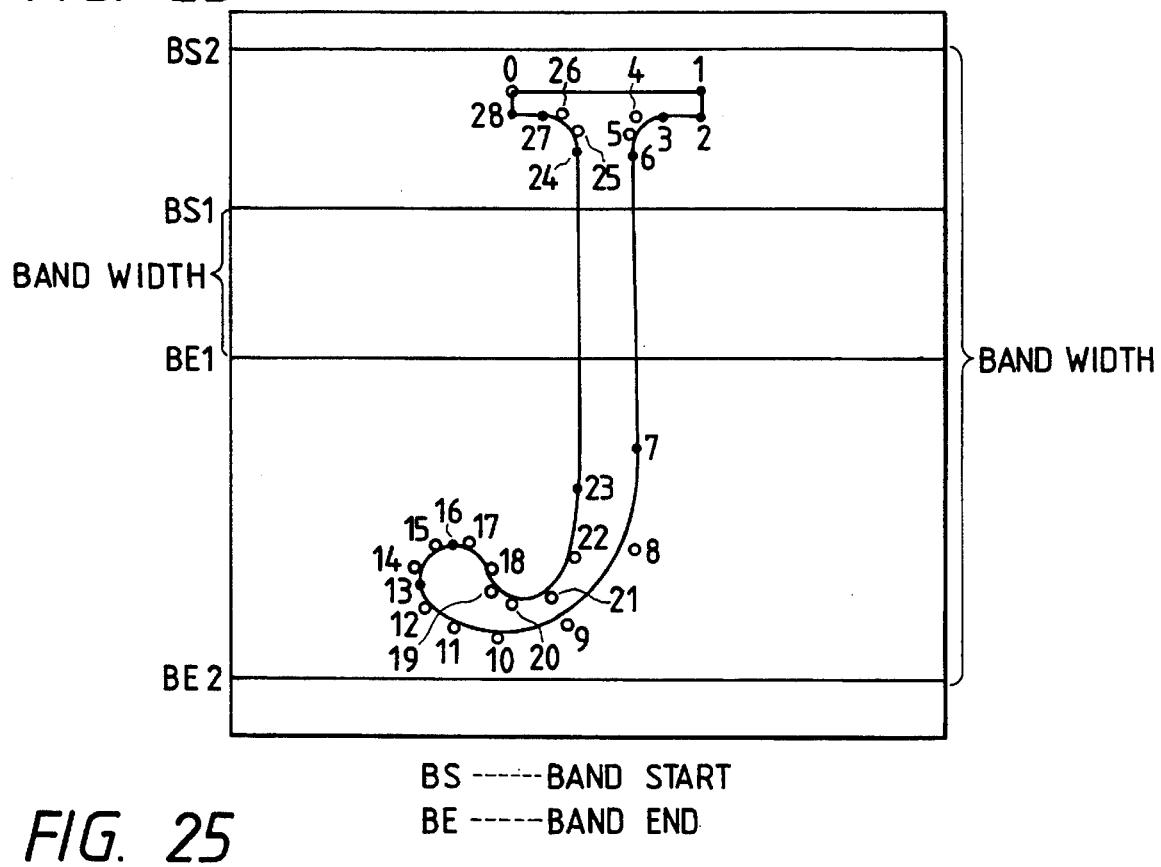
FIG. 23 is an explanatory diagram of a band width.
Figure 24:
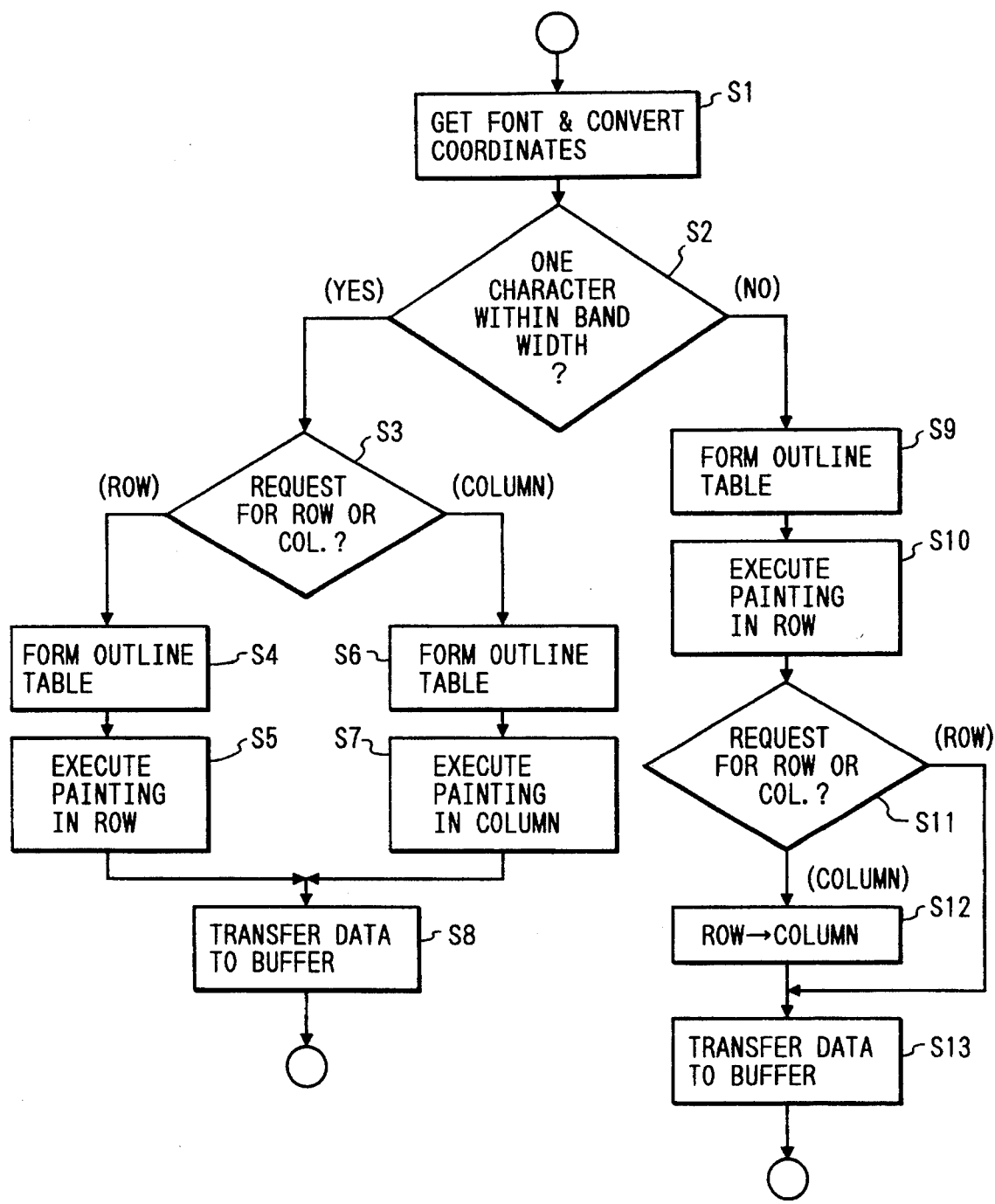
FIG. 24 is a flowchart showing an example of the switching of the processes due to the band width.

FIG. 24 shows an example in the case where the above-mentioned two examples are switched by the band width. The band width will now be described with reference to FIG. 23. The output request is sent from the line output type output device one line by one. One line corresponds to a line from the band start to the band end and this width is referred to as a band width. The band width corresponds to the output request area of the data in the dot form from the output device. In FIG. 24, in step S1, the data stored in the vector form is read out and is multiplied with the enlargement/ reduction ratio and the resultant data is converted into the coordinate data. In step S2, a check is made to see if the coordinate data lies within the band width or not. The discrimination in step S2 can be easily accomplished by comparing the Y coordinate of the coordinate data converted in step S1 with the coordinates of the band start and band end. If the coordinate data lies within the band width (in the case where the Y coordinate of the band start in FIG. 23 is set to $BS_2$ and the Y coordinate of the band end is set to BE$_2$), the processing time in the case of executing the painting process in row is equal to that in the case of performing the painting process in column. However, if the coordinate data does not lie within the band width (in the case where the Y coordinate of the band start in FIG. 23 is set to BS$_1$ and the Y coordinate of the band end is set to BE$_1$), the painting process is executed in row. In this case, the processing time is fairly shorter than that in the case of performing the painting process in column. When the coordinate data lies within the band width, step S3 follows and a check is made to see if the output request indicates row or column, the painting process is executed, and the data is transferred to the output request buffer in a manner similar to the example in FIG. 19. The processes in steps S3 to S8 are the same as those in steps S2 to S7 in FIG. 19. If the coordinate data does not lie within the band width in step S2, step S9 follows. The painting processing is executed in row, a check is made to see if the output request indicates row or column, the data conversion is executed, and the data is transferred to the output request buffer in a manner similar to the example of FIG. 20. The processes in steps S9 to S13 in FIG. 24 are the same as those in steps S2 to S6 in FIG. 20.

Figure 25:
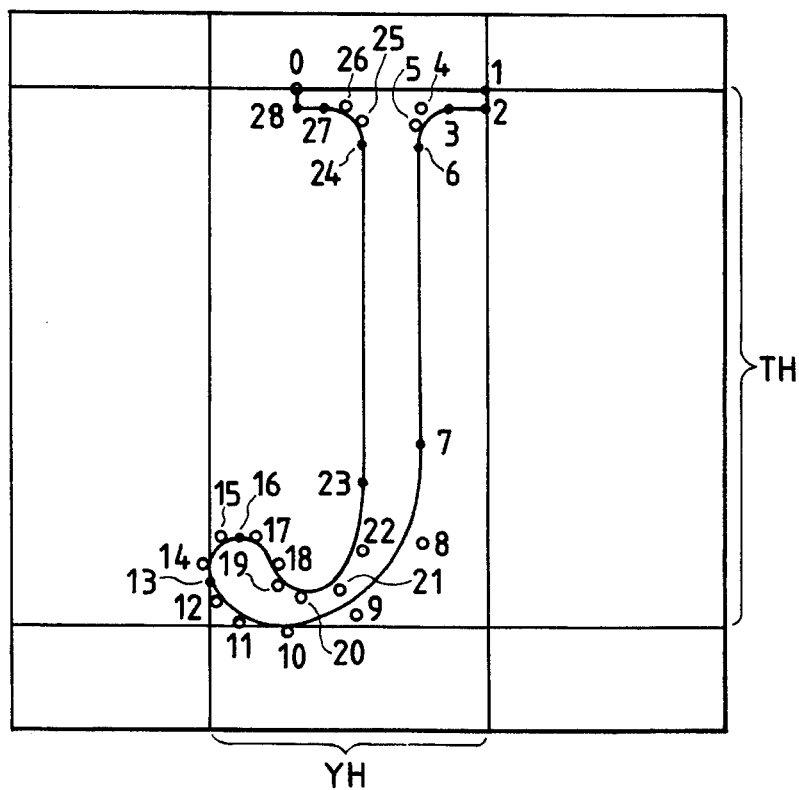
FIG. 25 is an explanatory diagram of a character width.
Figure 26:
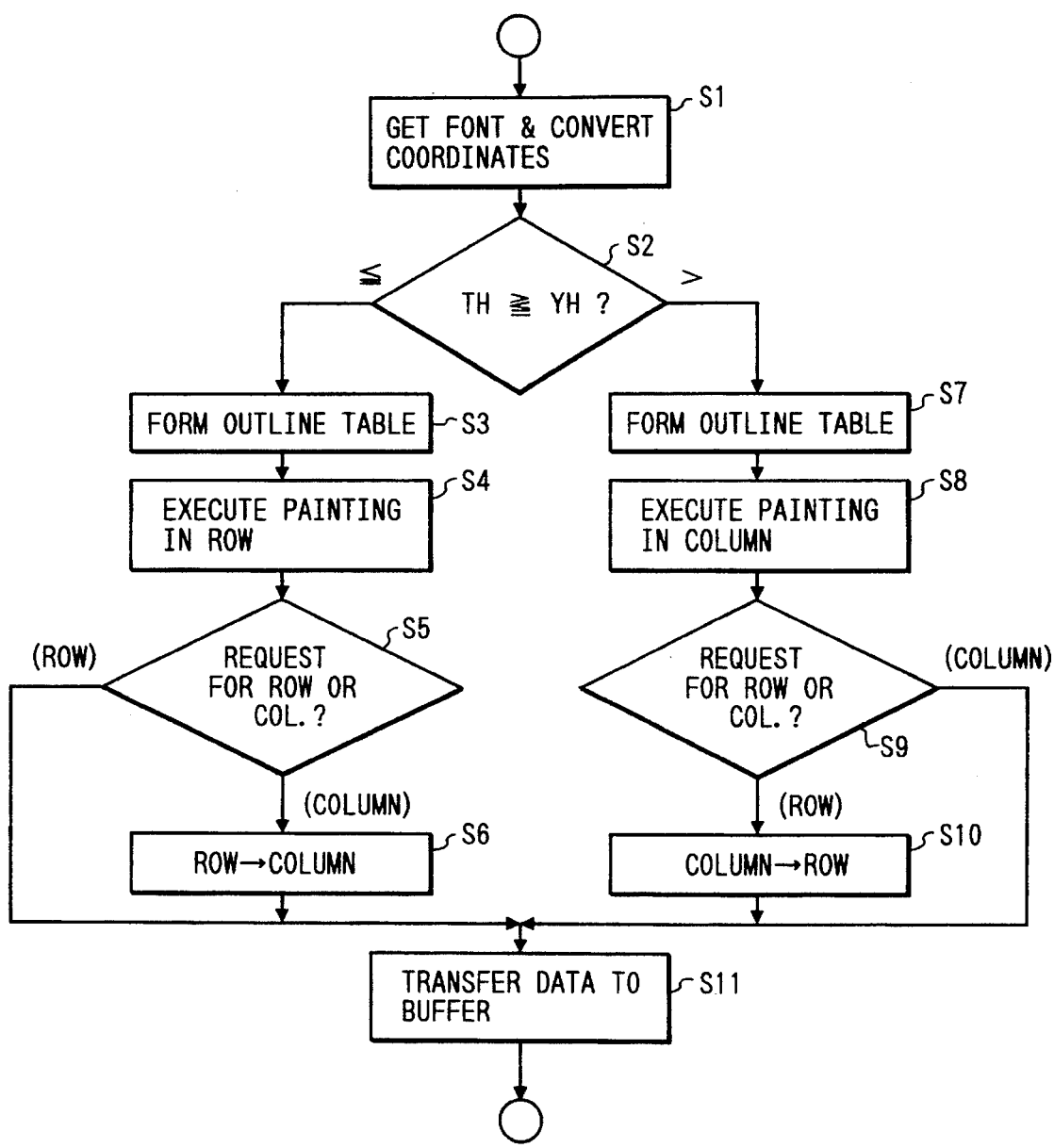
FIG. 26 is a flowchart showing an example of the switching of the processes due to the character width.
Figure 30:
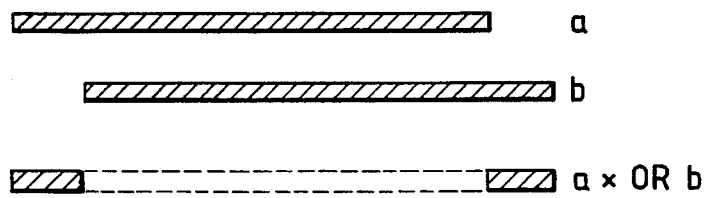
FIG. 30 is a diagram showing a conventional blanking method.

FIG. 26 shows an example in the case of switching whether the painting process is executed in row or column in accordance with a character in the example of FIG. 20 mentioned above. As shown in FIG. 25, there is a character whose vertical width TH is longer than a lateral width YH or there is a character whose lateral width YH is longer than the vertical width TH. In the case of a character having a longer vertical width, the processing time is short when the painting process is executed in column. On the other hand, in the case of a character having a long lateral width, the processing time is short when the painting process is executed in row. In FIG. 26, the data in the vector form is converted into the coordinate data in step S1. In step S2, the vertical width TH and the lateral width YH of the character are compared. The vertical width TH is obtained by subtracting the minimum value of the Y coordinate from the maximum value of the Y coordinate of the coordinate data converted in step S1. The lateral width YH is obtained by subtracting the minimum value of the X coordinate from the maximum value of the X coordinate of the coordinate data. When the lateral width of the character is equal to or larger than the vertical width of the character (YH≧TH), step S3 follows and the painting process is executed in row. In step S5, a check is made to see if the output request indicates row or column. If the output request indicates column, the data conversion from row to column is executed in step S6. The data is transferred to the output request buffer in step S11. If the vertical width of the character is longer than the lateral width of the character (TH>YH) in step S2, step S7 follows and the painting process in executed in column. In step S9, a check is made to see if the output request indicates row or column. If the output request indicates row, the data conversion from column to row is executed in step S10. The data is transferred to the output request buffer in step S11. Although the vertical width and lateral width of the character have been compared and the discrimination has been made in step S2, it is also possible to construct in a manner such that information indicating whether the painting process is executed in row or column is preliminarily provided every character and the switching between the row and the column is executed on the basis of such information.

As described above, according to the invention, it is possible to obtain a character processing apparatus in which by discriminating whether the output request indicates the row direction or the column direction, the data in the vector form can be efficiently converted into the data in the dot form.

As described above, according to the invention, it is possible to obtain a character processing apparatus in which whether the painting process is executed in the row direction or the column direction is discriminated on the basis of the data in the vector form and the memory area, thereby allowing the data in the vector form to be converted into the data in the dot form at a high speed.

[Prevention of lateral blanking in the NOT system]

An embodiment of the invention will now be described hereinbelow with reference to the drawings.

Figure 1A:
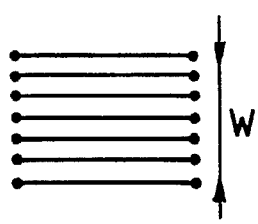
FIGS. 1A, 1B and 2 are explanatory diagrams of a conventional example corresponding to a construction to prevent the dot blanking of lateral lines as the fourth embodiment.
Figure 1B:
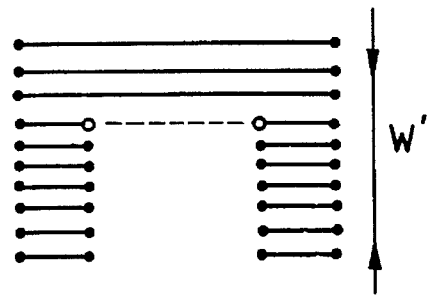

According to the invention, for instance, the data in the vector form as shown in FIGS. 1A and 1B are extracted, no process is executed for the pattern of (a), and in the case of the pattern of (b), the memory content is again inverted by the NOT, thereby uniforming the lateral line widths, so that a character of a high quality can be formed.

The operation in the embodiment with the above construction will now be described with reference to FIGS. 27 and 28 and a flowchart of FIG. 29.

Figure 2:
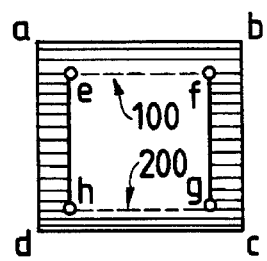

FIG. 27 relates to a data train in the vector form of the figure (quadrilateral abcd, efgh) which has been described in FIG. 2. According to the invention, a process is further executed to the data converted into the dot form data (figure shown in FIG. 2) from the data in the vector form, that is, from the data train shown in FIG. 27, thereby obtaining a figure shown in FIG. 28. FIG. 29 is a flowchart showing a feature of the invention and showing a flow to further obtain the figure shown in FIG. 28 from the figure of, for instance, FIG. 2. In step 1 in FIG. 29, among the data in the vector form, the adjacent data having the same Y coordinate are extracted.

In step 2, a check is made to see if the data between the two coordinates has already been painted as black dots in FIG. 2 or not. As a discriminating method, the data between the two coordinates is extracted and if the content of the data is constructed by black dots as a whole, it is decided that the area between them has already been painted, and if not, it is determined that the area is not painted. If the area has already been painted, step 4 follows. If the area is not painted yet, step 3 follows.

In step 3, as shown in FIG. 28, the vector data is sequentially converted into the dots from points e and f and the memory content is inverted by the NOT, thereby painting the content in the memory between the designated coordinates. The same shall also apply to the points h and g.

In step 4, a check is made to see if any data in the vector form to be processed still exists or not. If YES, the processing routine is returned to step 1 and the adjacent data whose Y coordinate values are the same are searched from the data in the vector form. If no data in the vector form does not exist, the processes are finished.

As described above, for the pattern which was once converted from the vector data into the dot data, the painting process due to the NOT is again executed at proper necessary positions, so that the lateral line width can be held uniform. Thus, it is possible to provide a character processing apparatus which can also form a character of a high quality even for a small character.

[Formation of blank character]

Explanation will now be made with respect to an embodiment in the case of forming a pattern with a frame of n dots on the basis of the data from a vector font.

Figure 31:
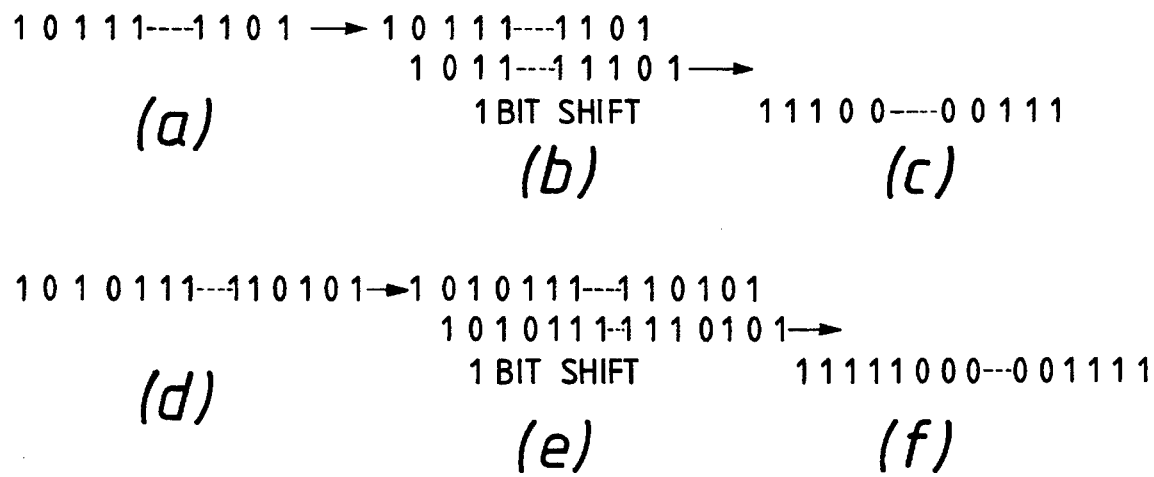
FIG. 31(a) to 31(f) are diagrams showing an embodiment to form a blank according to the invention.
Figures 32, 33:
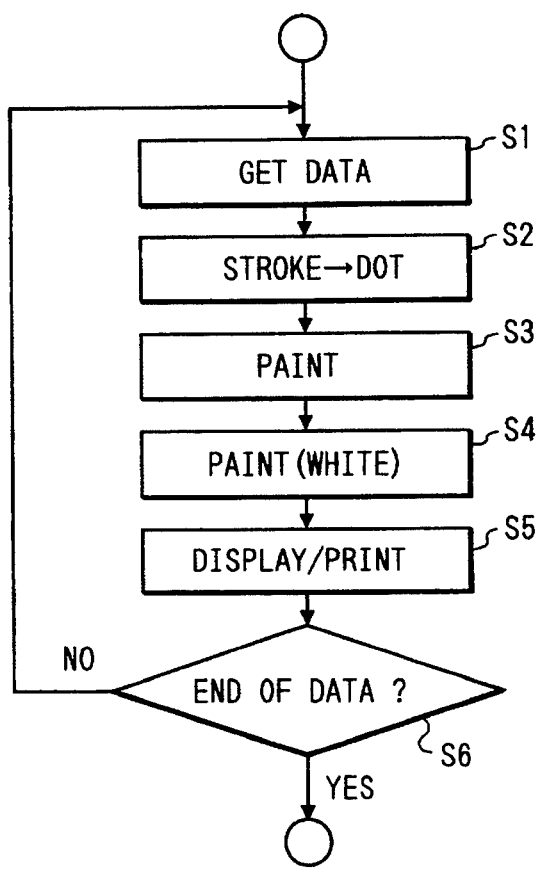
FIG. 32 is a flowchart for a procedure from the getting of document data until the display or printing thereof according to the invention.
FIG. 33 is a diagram showing a method of mixing "1" and "0" to a thickness of a frame.

In step S1 in FIG. 32, data such as a character or the like to be processed which was coded by a stroke display method is read out of the ROM 2 in FIG. 3 by a search code. In step S2, the stroke display type signal is converted into the dot display type signal by the converting circuit and stored into the RAM. In step S3, as shown in FIGS. 31(a) and 31(d), the signal obtained in step S2 is converted by the converting circuit by mixing "0" to proper positions between the "1" signal of the line output and the "1" signal. FIG. 31(a) relates to the dot display type signal to form a frame of three dots. FIG. 31(b) relates to the dot display type signal to form a frame of five dots. In step S4, as shown in FIGS. 31(b) and 31(e), the data obtained in step S3 is shifted by one bit and the exclusive OR or the shifted data and the data before it is shifted is calculated. Thus, a blank figure having a thickness of frame of three dots, five dots, or the like as shown in FIGS. 31(c) and 31(f) can be formed.

A construction to mix "1" and "0" to the thickness of frame is shown in FIG. 33. Such a construction is stored as tables in the ROM 2 in FIG. 3. In step 3 mentioned above, on the basis of the information indicative of the thickness of frame of the blank figure, one of the tables is accessed by a command from the operator or the like and "0" is mixed to proper positions between the "1" signal of the line output and the "1" signal. The above processes can be also accomplished by logic arithmetic operations such as to set the second bit to "0" instead of using the tables.

In step S5, the dot display type signal formed is output to the output device such as display device, printer, or the like.

In step S6, a check is made to see if any data to be displayed or printed still exists or not. If YES, step S1 follows. If NO, the processes are finished.

As described above, it is possible to provide a figure forming system in which by mixing the "0" signal to proper positions between the "1" signal of the line output and the "1" signal and converting the signal, the desired signal can be obtained by shifting the number of dots necessary for framing such as blanking or the like by one bit, so that a blank figure can be formed at a high speed.

What is claimed is:

1. A character processing apparatus comprising:

means for reading out data stored in a vector form;

first converting means for multiplying an enlargement/reduction ratio by the data from said reading out means and converting the data into enlarged/reduced data;

second converting means for converting data converted by the first converting means into data in a dot form; and means for, in a case where data in a dot form converted based on enlarged/reduced data is to be output over a plurality of output areas, extracting data from the enlarged/reduced data obtained after completion of the conversion by said first converting means, wherein the extracted data obtained after conversion by said first converting means is converted into data in a dot form by said second converting means.

2. An apparatus according to claim 1, wherein the extracted data comprises coordinate data of a point inside each output area and coordinate data of a second point, adjacent to that point, outside the output area.

3. An apparatus according to claim 2, wherein when the coordinate data of the second point comprises coordinate data representing an intermediate point for representing a curve, said extracting means extracts from coordinate data of a start point of the curve to coordinate data of an end point of the curve.

4. An apparatus according to claim 1, wherein the extracted data comprises coordinate data of two points between which each output area is sandwiched.

5. An apparatus according to claim 1, wherein each output area comprises a band area.

6. An apparatus according to claim 1, wherein said second converting means converts the data into the dot form through NOT dot inversion.

7. An apparatus according to claim 1, further comprising:

storage means for storing the enlarged/reduced data;

discriminating means for discriminating, prior to storing the enlarged/reduced data, whether the enlarged/reduced data corresponding to the data in the vector form and representing a number of characters to be output can be stored in said storage means when storing the converted data in the storage means; and control means for controlling a method of storing the enlarged/reduced data corresponding to the data in the vector from in the storage means in response to a result of the discrimination by said discriminating means, wherein the method controlled by said control means comprises storing the enlarged/reduced data in the storage means a plurality of times in accordance with the amount of data in the vector form.

8. A character processing method comprising the steps of:

reading out data stored in a vector form;

multiplying an enlargement/reduction ratio by the data from said reading out means and converting the data by a first conversion to form enlarged/reduced data;

converting data converted by the first converting into data in a dot form in a second conversion; and in a case where data in a dot form converted based on enlarged/reduced data is to be output over a plurality of output areas, extracting data from the enlarged/reduced data obtained after completion of the first conversion, wherein the extracted data obtained after the first conversion is converted into data in a dot form by said second conversion.

9. A method according to claim 8, wherein the extracted data comprises coordinate data of a point inside each output area and coordinate data of a second point, adjacent to that point, outside the output area.

10. A method according to claim 9, wherein, when the coordinate data of the second point comprises coordinate data representing an intermediate point for representing a curve, said extracting step includes extraction from coordinate data of a start point of the curve to coordinate data of an end point of the curve.

11. A method according to claim 8, wherein the extracted data comprises coordinate data of two points between which each output area is sandwiched.

12. A method according to claim 8, wherein each output area comprises a band area.

13. A method according to claim 8, wherein said second converting step includes converting the data into the dot form through NOT dot inversion.

14. A method according to claim 8, further comprising the steps of:

storing the enlarged/reduced data in a storage medium;

discriminating, prior to storing the enlarged/reduced data, whether the enlarged/-reduced data corresponding to the data in the vector form and representing a number of characters to be output can be stored in the storage medium when storing the converted data in the storage medium; and controlling a method of storing the enlarged/reduced data corresponding to the data in the vector from in the storage medium in response to a result of the discrimination performed in said discriminating step, wherein the method controlled in said controlling step comprises storing the enlarged/reduced data in the storage medium a plurality of times in accordance with the amount of data in the vector form.

15. A character processing apparatus comprising:

means for reading out data stored in a vector form;

means for multiplying data from said reading out means by an enlargement/reduction ratio and for converting the multiplied data into enlarged/reduced data;

storage means for storing the converted data;

discriminating means for discriminating prior to storing the converted data whether the converted data corresponding to the data in the vector form and representing a predetermined number of characters can be stored into said storage means when storing the converted data into the storage means; and control means for controlling a method of storing the converted data corresponding to the data in the vector form into the storage means in response to a result of the discrimination by said discriminating means, wherein the method controlled by said control means determines whether the converted data storage into the storage means is executed a plurality of times in accordance with the amount of data in the vector form.

16. An apparatus according to claim 15, wherein the converted data is stored into said storage means, conversion into dot form data is executed based on the stored converted data, and the converted dot form data is transferred to an output apparatus.

17. A character processing apparatus for reading out data stored in a store in a vector form and converting the data read out from the store into data in a dot form, comprising:

means for discriminating whether an output request indicates a row direction or a column direction;

means for converting from the vector form to the dot form along the row direction;

means for converting from the vector form to the dot form along the column direction;

selecting means for selecting either one of said converting means in response to a result of operation of the discriminating means; and output means for outputting the dot form data converted by said selected converting means in an output area, wherein the output area may be smaller than an area required to output the dot form data.

18. An apparatus for reading out data stored in memory means in a vector form and converting the data read out in a vector form into data in a dot form, comprising:

means for discriminating whether an output request indicates a row direction or a column direction;

means for multiplying the data read out in vector form by a magnification according to the output request and converting the data into data corresponding to the magnification and, thereafter, executing a painting process for filling in an area between dots; and means for determining whether the painting process is executed in the row direction or the column direction after completion of conversion for an area of data stored in the memory means.

19. A character processing apparatus which can convert data from a vector form to a dot form, comprising:

means for painting an area which is specified by data in the vector form;

means for extracting data representing a straight line parallel to a direction of the painting by said painting means from the data in the vector form; and means for again painting the extracted data in the area.

20. An apparatus according to claim 19, wherein the data to improve the quality is dot data whose y coordinates are equal among the data in the vector form.

21. An apparatus according to claim 19, wherein said painting means executes a painting operation by a NOT logic operation.

22. A figure forming system comprising:

memory means for storing data in a vector form;

converting means for converting an output signal from the memory means into a dot display type signal; and means for performing logic arithmetic operations by mixing a logic "1" signal and a logic "0" signal into signals between a logic "1" signal of a line output and a logic "1" signal of the dot display type signal and executing a conversion, wherein the logic arithmetic operations are executed so that a blank or other figure is formed.

23. An apparatus according to claim 22, wherein the logic arithmetic operations comprise an exclusive OR logic operation.

24. A character processing method comprising the steps of:

reading out data stored in a vector form;

multiplying the read out data by an enlargement/reduction ratio to convert the data into enlarged/reduced data;

storing said converted data in a memory;

discriminating prior to storing the converted data whether the converted data corresponding to the data in the vector form and representing a predetermined number of characters can be stored in the memory when storing the converted data into the memory; and controlling storing the converted data corresponding to the data in the vector form into the memory according to a result of the discrimination by said discriminating means, wherein the controlling step controls whether the converted data storage into the store is executed a plurality of times in accordance with the amount of data in the vector form.

25. A character processing method for reading out data stored in a store in a vector form and converting the data read out from the store into data in a dot form, comprising the steps of:

discriminating whether an output request indicates a row direction or a column direction;

selecting either one of converting from the vector form to the dot form along the row direction and converting from the vector form to the dot form along the column direction according to a result of operation of the discriminating step; and outputting the converted dot form data in an output area, wherein the output area may be smaller than an area required to output the dot form data.

26. A method according to claim 25, wherein the converted data is stored into the storage medium, conversion into dot form data is executed based on the stored converted data, and the converted dot form data is transferred to an output apparatus.

27. A method for reading out data stored in a memory in vector form and converting the data read out in a vector form into data in a dot form, comprising the steps of:

discriminating whether an output request indicates a row direction or a column direction;

multiplying the data read out in vector form by a magnification according to the output request and converting the data into data corresponding to the magnification and, thereafter, executing a painting process for filling in an area between dots; and determining whether the painting process is executed in the row direction or the column direction after completion of conversion for an area of data stored in the memory.

28. A character processing method which can convert data from a vector form to a dot form, comprising the steps of:

painting an area which is specified by data in the vector form;

extracting data representing a straight line parallel to a direction of the painting from the data in the vector form; and again painting the extracted data in the area.

29. A character processing method according to claim 28, wherein the data to improve the quality is dot data whose y coordinates are equal among the data in vector form.

30. A figure forming method comprising the steps of:

storing data in a vector form in a memory;

converting an output signal from the memory into a dot display type signal; and performing logic arithmetic operations by mixing a logic "1" signal and a logic "0" signal into signals between a logic "1" signal of a line output and a logic "1" signal of the dot display type signal and executing a conversion, wherein the logic arithmetic operations are executed so that a blank or like figure is formed.

31. A method according to claim 28, wherein said painting step includes executing a painting operation by a NOT logic operation.

32. An apparatus according to claims 1, 15, 17, 18, 19 or 22, wherein said apparatus performs a document processing.

33. An apparatus according to claims 1, 15, 17, 18, 19 or 22, further comprising serial print means for outputting data.

34. A method according to claim 30, wherein the logic arithmetic operations comprise an exclusive OR logic operation.

35. A method according to claims 8, 24, 25, 27, 28 or 30, wherein data is output by a serial printer.

36. An apparatus according to claims 8, 24, 25, 27, 28 or 30 wherein the method performs a document processing.

* * * * *